United States Patent
Kumar et al.

(10) Patent No.: US 9,503,452 B1
(45) Date of Patent: Nov. 22, 2016

(54) SYSTEM AND METHOD FOR IDENTITY RECOGNITION AND AFFILIATION OF A USER IN A SERVICE TRANSACTION

(71) Applicant: Automiti LLC, Cupertino, CA (US)

(72) Inventors: Srinivas Kumar, Cupertino, CA (US); Atul Gupta, Sunnyvale, CA (US); Shashank Jaywant Pandhare, Kothrud Pune (IN)

(73) Assignee: AUTOMITI LLC, Cupertino, CA (US)

( * ) Notice: Subject to any disclaimer, the term of this patent is extended or adjusted under 35 U.S.C. 154(b) by 0 days.

(21) Appl. No.: 15/193,764

(22) Filed: Jun. 27, 2016

Related U.S. Application Data

(60) Provisional application No. 62/319,626, filed on Apr. 7, 2016.

(51) Int. Cl.
  *H04L 9/00* (2006.01)
  *H04L 29/06* (2006.01)
  *H04L 29/08* (2006.01)

(52) U.S. Cl.
  CPC ......... *H04L 63/083* (2013.01); *H04L 63/0876* (2013.01); *H04L 67/306* (2013.01)

(58) Field of Classification Search
  CPC .............................. H04L 9/00; H04L 63/083
  See application file for complete search history.

(56) References Cited

U.S. PATENT DOCUMENTS

| | | |
|---|---|---|
| 8,719,911 B2 | 5/2014 | Novack et al. |
| 8,869,245 B2 | 10/2014 | Ranganathan et al. |
| 8,966,602 B2 | 2/2015 | Gandhi et al. |
| 8,973,102 B2 | 3/2015 | Jakobsson |
| 9,195,834 B1 | 11/2015 | Jakobsson |
| 9,270,670 B1 | 2/2016 | Fitzgerald |

(Continued)

FOREIGN PATENT DOCUMENTS

| | | |
|---|---|---|
| WO | WO 2011/026695 A1 | 3/2011 |
| WO | WO 2014/055279 A1 | 4/2014 |
| WO | WO 2016/022058 A1 | 2/2016 |

OTHER PUBLICATIONS

C. Paquin, "U-Prove Technology Overview V1.1", Apr. 2013, pp. 1-23, Microsoft Corporation.

(Continued)

*Primary Examiner* — William Powers
(74) *Attorney, Agent, or Firm* — Buchanan Ingersoll & Rooney PC

(57) ABSTRACT

The method integrates the dynamic and authoritative posture of an authenticated user, a registered device, and a registered service provider as a conclusive proof of identity recognition for affiliation of associated contextual attribution and referential integrity. In addition to relieving the user of the burden of remembering multiple passwords for a plurality of services, the method provides a means to facilitate an affiliation oriented architecture for a broad spectrum of web and cloud based services with affiliation aware content streaming, leveraging the affiliation score as a key trust metric. The method provides protection from user-agnostic delegation and impersonation of identity, social engineering, and compromised passwords, which are exploited by numerous strains of landed malware to launch multi-stage coordinated cyber-attacks on consumer accounts and enterprise systems. The method of affiliation based on identity recognition provides authoritative, contextual, and consensual user information, of relevance in a live transaction, to the service provider.

12 Claims, 27 Drawing Sheets

(56) References Cited

U.S. PATENT DOCUMENTS

| | | | |
|---|---|---|---|
| 9,317,849 B2* | 4/2016 | Pitroda | G06Q 20/3829 |
| 2001/0004736 A1* | 6/2001 | Hirano | G06T 1/0021 |
| | | | 705/51 |
| 2002/0042884 A1* | 4/2002 | Wu | G06F 21/645 |
| | | | 726/10 |
| 2004/0078538 A1* | 4/2004 | Dutt | G06F 8/451 |
| | | | 711/168 |
| 2006/0053296 A1 | 3/2006 | Busboom et al. | |
| 2007/0288247 A1* | 12/2007 | Mackay | G06Q 10/00 |
| | | | 705/1.1 |
| 2009/0187988 A1 | 7/2009 | Hulten et al. | |
| 2012/0284282 A9 | 11/2012 | Ghosh et al. | |
| 2013/0145447 A1 | 6/2013 | Maron | |
| 2014/0237570 A1 | 8/2014 | Shishkov et al. | |
| 2015/0058931 A1 | 2/2015 | Miu et al. | |
| 2015/0095986 A1 | 4/2015 | Karpey et al. | |
| 2015/0113625 A1 | 4/2015 | Gandhi et al. | |
| 2015/0121475 A1 | 4/2015 | Cashman et al. | |
| 2015/0128240 A1 | 5/2015 | Richards et al. | |
| 2015/0170148 A1 | 6/2015 | Priebatsch | |
| 2015/0286816 A1 | 10/2015 | Adler et al. | |

OTHER PUBLICATIONS

D. Coxe et al., "Joint White Paper: Attribute-Based Access Control Solutions: Federating Authoritative User Data to Support Relying Party Authorization Decisions and Requirements", Apr. 10, 2013, pp. 1-6, ID/DataWeb.

D. Coxe, "White Paper: Attribute Based Access Control (ABAC) with an Attribute Exchange Network (AXN): Attribute Federation to Enable Secure Information Sharing", Sep. 9, 2013, pp. 1-6, ID/DataWeb.

\* cited by examiner

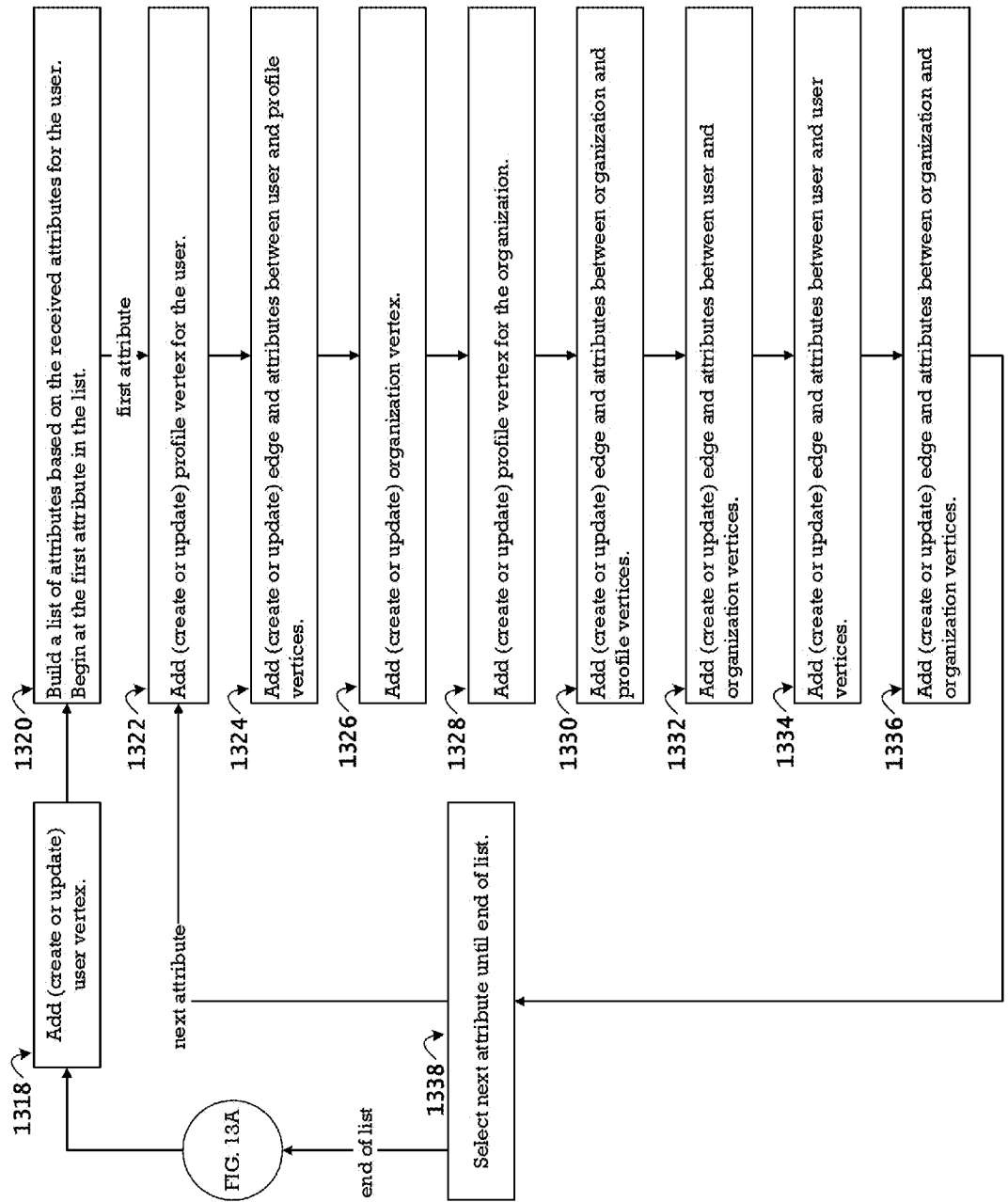

| Description | Data Source(s) | Category | Component | Attributes | Value | Score Type | Score Calculus | Impact |
|---|---|---|---|---|---|---|---|---|
| Credit History | Credit Bureau | Personal | Finance | Credit Score | FICO Score | Static | Ranking Equation | Positive |
| Social Network | Service Provider | Social | Reference | Association Type Connections Endorsements Groups Blogs | Parent, Sibling, Child, Employer, Employee, Member, Colleague, Friend, Advisor, Contact, Vendor, Contractor, Supervisor, Student, Client, Doctor, Landlord, Banker, Partner, Agent, Coach, Teacher, Tutor, Associate, Intern | Static | Weighted Equation | Positive |
| Education | National Student Clearinghouse (or Member) | Personal | Education | Degree Years of Study College Attended College Ranking GPA Graduation Year | High School, Graduate, Post Graduate, None | Dynamic | Multi Attribute Function | Positive |
| Passport (Proof of Identity) | Passport Authority | Personal | Civic | Passport Issuing Authority Date of Issue Expires On | Active, Expired, None | Static | Discrete Value | Positive |
| Drivers License (Proof of Residence) | State Agency (Motor Vehicles) | Personal | Civic | Drivers License State | Active, Expired, Cancelled, None | Static | Discrete Value | Any |
| Identification Card (Proof of Identity) | State Agency (Motor Vehicles) | Personal | Civic | ID Card State | Active, Expired, Cancelled, None | Static | Discrete Value | Any |
| Vehicle Registration | State Agency (Motor Vehicles) | Personal | Civic | Vehicle Registration State | Active, Expired, None | Static | Discrete Value | Positive |
| Vehicle Insurance | Insurance Provider | Personal | Insurance | Vehicle Insurance State | Active, Expired, None | Static | Discrete Value | Any |
| Health Insurance | Insurance Provider | Personal | Insurance | Health Insurance State | Active, Expired, None | Static | Discrete Value | None |
| Property Insurance | Insurance Provider | Personal | Insurance | Property Insurance State | Active, Expired, None | Static | Discrete Value | Any |
| Group Membership | Public Organizations | Professional | Honorary | Membership Accreditation Registration | Local, Domestic, International, None | Dynamic | Ranking Equation | Positive |
| Group Membership | Private Organizations | Professional | Honorary | Membership Accreditation Registration | Local, Domestic, International, None | Dynamic | Ranking Equation | Positive |
| Group Membership | Community | Social | Reference | Membership Accreditation Registration | Local, Domestic, International, None | Dynamic | Ranking Equation | Any |
| Board Membership | Member | Professional | Honorary | Membership | Active, Expired, None | Dynamic | Ranking Equation | Positive |
| Certifications | Member | Professional | Education | Certification | | Dynamic | Weighted Equation | Positive |
| Work Occupation | Member | Enterprise | Employment | Occupation | | Dynamic | Ranking Equation | Positive |
| Work Experience | Member | Enterprise | Employment | Work Experience | | Dynamic | Ranking Equation | Positive |
| Employment History | Employer | Enterprise | Employment | Company Employees Revenues Company Ranking Job Position Years of Service | | Dynamic | Weighted Equation | Positive |

FIG. 13F

| Description | Data Source(s) | Category | Component | Attributes | Value | Score Type | Score Calculus | Impact |
|---|---|---|---|---|---|---|---|---|
| Utility Services | Utility Company | Personal | Utility | Utility Type<br>Utility Status | Gas, Electric, Cable, Water, Garbage<br>Active, Expired, None | Static | Discrete Value | Any |
| Criminal History | Background Check Engines | Personal | Civic | Criminal Record | Conviction, Non-Conviction, Expunged, None | Dynamic | Multi Attribute Function | Any |
| Driving History | State Agency (Motor Vehicles) | Personal | Civic | Citation<br>State | | Dynamic | Multi Attribute Function | Any |
| Property Ownership | Background Check Engines | Personal | Property | Property Status<br>City<br>State | Owner, Renter, Foreclosure, None | Dynamic | Multi Attribute Function | Positive |
| Email Accounts | Background Check Engines | Personal | Civic | Account Type<br>Account Status | Personal, Professional<br>Active, Expired, None | Dynamic | Weighted Equation | Positive |
| Salary History | Member | Professional | Finance | Salary<br>Income Group | Low, Middle, High | Static | Discrete Value | Positive |
| Residence History | Member | Personal | Travel | City<br>State | | Static | Discrete Value | Positive |
| Personal Health Record | Insurance Provider | Personal | Health | Health Condition | ICD/HCPSC/CPT Codes | Static | Discrete Value | Positive |
| Date of Birth | Member | Personal | Civic | Age<br>Age Group | Child, Teenager, Adult, Senior, Generation X, Generation Y | Static | Discrete Value | Positive |
| Gender | Member | Personal | Civic | Gender | Male, Female | Static | Discrete Value | Positive |
| Countries Visited in Last X Years | Member | Social | Travel | Country Status<br>Country | Travel Advisory, Restricted, ITAR<br>Country Code | Dynamic | Multi Attribute Function | Any |
| Ethnic Group | Member | Personal | Civic | Ethnicity | White or Caucasian, African American or Black, Hispanic or Latino, Native American Indian and Alaska Native, Asian, Other Pacific Islander or Native Hawaiian, Two or more races | Static | Discrete Value | Positive |
| Citizenship | Member | Personal | Civic | Citizenship | Country Code | Static | Discrete Value | Positive |
| Veteran | Member | Personal | Civic | Veteran | Yes, No | Static | Discrete Value | Positive |
| Disabled | Member | Personal | Civic | Disabled | Yes, No | Static | Discrete Value | Positive |
| Military Duty | Member | Professional | Service | Military Service | Active, Reserve, Retired, Discharged, None | Static | Discrete Value | Positive |
| Volunteer Worker | Member | Professional | Service | Volunteer Worker<br>Months<br>Sector | Yes, No<br><br>Education, Healthcare, First Responder, Social, Other | Dynamic | Multi Attribute Function | Positive |
| Recognition | Member | Personal | Civic | Award<br>Certification<br>Credit | | Static | Discrete Value | Positive |

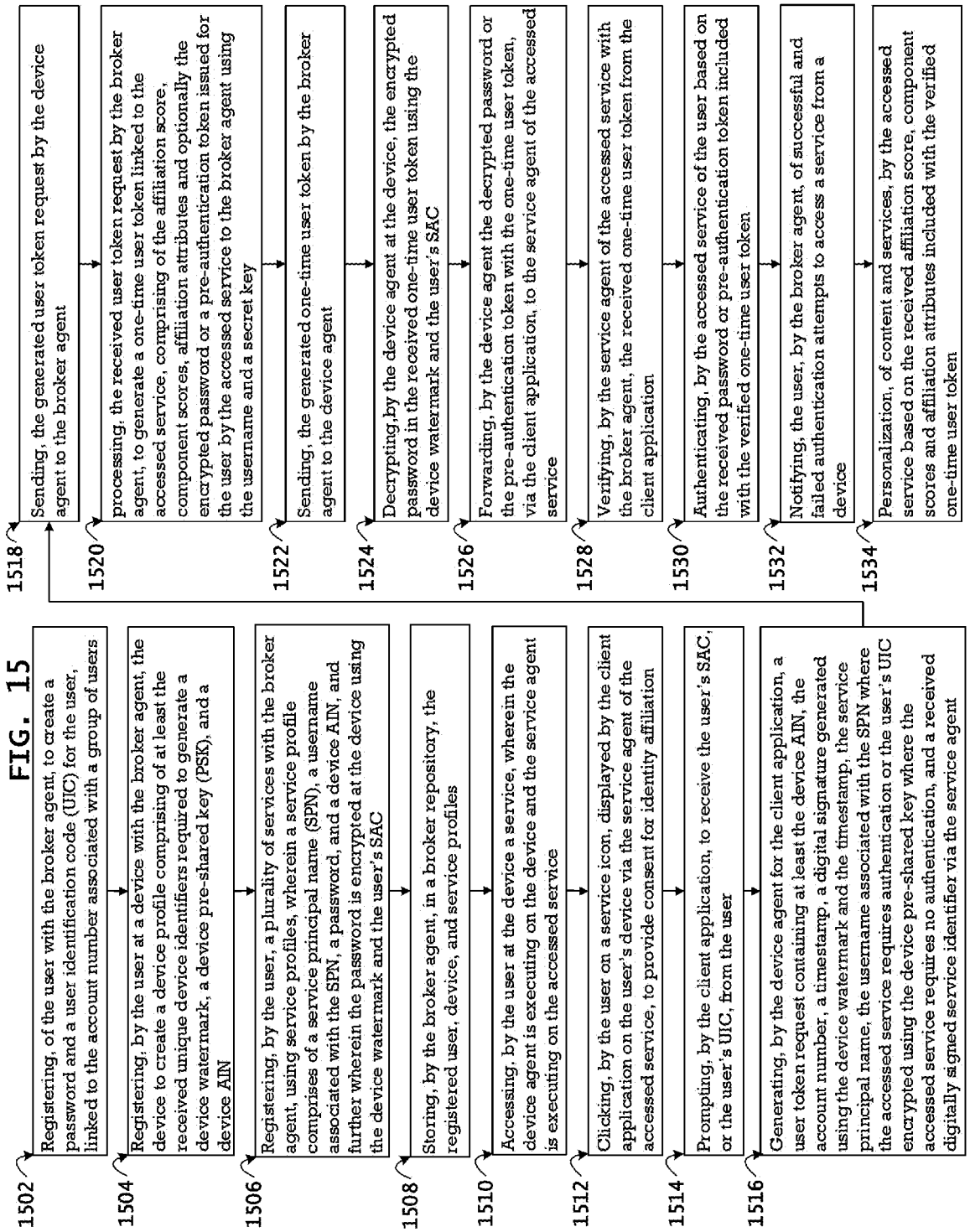

SYSTEM AND METHOD FOR IDENTITY RECOGNITION AND AFFILIATION OF A USER IN A SERVICE TRANSACTION

BACKGROUND OF THE DISCLOSURE

Field of the Disclosure

This invention relates to the field of cybersecurity and, more particularly, to a system and method to provide authoritative user identity recognition based device association and proof of presence of the user at the device, and user affiliation based on static and association attributes of a recognized user. The invention also provides a method to break the "kill chain," which causes a network compromise and/or a data breach, by enhancing the user login ceremony (authentication sequence) with identity recognition and affiliation as key trust metrics to prevent the exploit of compromised user credentials.

Description of the Related Art

Legacy authentication mechanisms relied solely on the use of a password to identify a user authoritatively with proof of possession of credentials as the single factor. This is referred to as the "what you know" factor. The likelihood of a password compromise being the root cause of an intrusion and data breach drove the industry to promote two-factor authentication based on the "what you have" factor as the quintessential second factor. The second factor could be a key fob with a one time code, a fingerprint, smart card, or other biometric techniques. The user must furnish proof of possession of two artifacts for multi-factor authentication. To strengthen passwords, "one-time" passcodes are used as a mechanism to introduce entropy.

However, a significant problem that remained was the proliferation of passwords as Internet enabled applications and services hosted in the cloud. Users face the challenge of creating strong passwords for every service or application they use, and the burden of making these passwords harder to guess or crack with automation. CAPTCHA (Completely Automated Public Turing test to tell Computers and Humans Apart") is used as a challenge-response to thwart automated password cracking attacks. The emerging cybersecurity threats, referred to as advanced persistent attacks, are highly coordinated and multi-stage attacks that leverage the user as the weakest link in the chain. User is the carbon, the exploit and staging surface for such high end attacks. Once a user's account is compromised, role based access controls are rendered ineffective. That shifts the onus of breach prevention on user behavior recognition. This is a challenge because a compromised user essentially delegates permissions and privileges to the attacker (human or malware) to perform legitimate actions and operations on behalf of the user, thereby rendering anomaly detection unreliable. Such compromised actions may vary from financial transactions, online payments, attacks on critical infrastructure, theft of intellectual property, takeover of Internet of Things (IoT) devices, to ransomware.

Other approaches, based on use of symmetric or asymmetric encryption technologies, rely on solutions that manage passwords in an identity vault for automated authentication, or rely on a first entity to authoritatively authenticate a user in one realm for use in another realm by another relying entity (single sign on). Such methods require implicit trust in the identity provider. The Security Token Service (STS) offers a protocol and schema (Security Assertion Markup Language—SAML) to achieve two party trust. Other approaches propose the use of more than two (multi-part) keys for encryption of credentials. However, the original problem persists as the user must still enter a username and password (combination pair) to login to the primary provider (single sign-on) and the risk is further exacerbated because now a compromised single credential provides the attackers access to a plurality of websites and applications without requiring explicit re-authentication.

The stricter password strength requirements imposed by online services have led to users unable to remember passwords, self-evident by the "Forgot Password" hyperlink and security questions to reset or recover passwords. The password centric authentication paradigm is outdated and needs retooling to the realities of modern cyber regime.

The major technology gap that remains is that none of the existing approaches provide conclusive "proof of identity recognition" that is the key driver for "use of affiliation" that enables dynamic and consensual attribution of the user, or a user device, and provides referential integrity to a service provider for the purpose of personalization and customization of services for the user or user device. Further, the risks posed by social engineering, an intrusion method by which hackers exploit the vulnerability and psychology of human interactions for cybercrime, are amplified by reliance on naïve user's awareness of modi operandi of professional hackers and/or shifting the onus of password protection to non-technical users in a utility model multi-tenant ecosystem.

Passwords are the weakest link in the cyber kill chain. Compromise of a single password may cause an intrusion and subsequent data breach. Theft of passwords in a data breach may cause harm to several users. Breach of user's password may lead to identity fraud. Accordingly, there is a need to protect passwords for responsible digital citizenship, preempt data breaches caused by compromise of an employee or contractor password, or stolen devices, and preempting cyber-attacks on ubiquitous IoT devices through malicious access.

SUMMARY OF THE DISCLOSURE

Unlike contemporary single sign on (SSO) and brokered authentication services that provide federated identity or tokens for implicit cross realm authentication, the present disclosure describes a method for authoritative proof of device-associated identity beyond a device-agnostic passcode provided by the user. The cyber threats (e.g., data breaches, damage to mission critical assets, ransomware, etc.) orchestrated by using infected, compromised, unmanaged, or unknown devices may be mitigated by such a methodology.

The technology challenge today is in establishing non-repudiable trust in the provenance of an authenticated user, preempting risks posed by exploit of stolen user credentials, and qualifying connections in the social network for authoritative affiliation.

The proposed system and method provide authoritative Identity Recognition of an authenticated user, wherein the user authentication requires a device watermark associated with the user's device and Identity Affiliation of the user in a service transaction by means of a user token issued by a broker and a service identifier issued by the accessed service, wherein the affiliation information is transmitted as a user token that includes a dynamically computed affiliation score, component scores, and affiliation attributes.

The device watermark is not stored on the user's device or on the broker server, is not stored in memory or on storage media on the user's device or on the broker server, is never transmitted on the network, and is dynamically generated using a hash function autonomously on the user's device and on the broker server. The device watermark is generated using a plurality of device identifiers tightly coupled and locked to the user's device, wherein the device identifiers include volatile and non-volatile software, system, and hardware level indicators. Further, the disclosed device watermark does not require any external physical device such as, for example, a universal serial bus (USB) pluggable dongle, a hardware fob, a key fob or a registered phone to receive a one-time passcode, as required by two-factor authentication mechanisms.

The service identifier issued by the accessed service is digitally signed with a server private key and transmitted over a secure encrypted channel (e.g. HTTPS) with extended server certification validation.

The user token for identity affiliation is generated only upon service identifier verification and transmitted over a secure encrypted channel (e.g. HTTPS).

The proposed method of Identity Recognition is not yet another method for password management or protection. Instead, the proposed innovation clearly defines Identity Recognition as a method of identifying the user prior to an authentication ceremony based on a device watermark associated with the user's device, a service identifier for verification of the accessed service prior to transmittal of the encrypted password for decryption at the user's device, and decryption on the user's device of the encrypted password using the device watermark and the user's personal identification code known only to the user and linked to the accessed service that requires user authentication, or the user identification code encrypted using a device pre-shared secret for the accessed service that does not require user authentication.

The proposed method of Identity Affiliation is defined as a mechanism to generate and issue a user token comprising of at least an affiliation score, component scores, and affiliation attributes for the user requested by the accessed service and consented to by the user during a service transaction with or without user authentication. The user token request generation requires use of the device watermark, the device pre-shared secret, and a user identification code. Further, the affiliations of a user are qualified and consented relationships between other users and organizations.

The proposed service authentication codes and user identification codes as exemplary embodiments of the user personal identification code provide the ability for multiple users to securely share a single device and the associated device watermark using different private personal identification codes.

The proposed method of service identifier verification prior to transmittal of the encrypted password for decryption at the local user device serves as an effective control to automatically preempt phishing attacks staged on gullible users.

The proposed method of identity affiliation serves as an effective control to automatically preempt watering hole attacks staged against a group of users by infecting websites visited by the cohort. The affiliation request, without requiring user authentication by the accessed website, provides the ability to identify a lone wolf or a cybercrime syndicate member and the geo-location of the attacker because of the qualified and consented nature of affiliations.

The proposed method of the disclosed system provides recognition of the user and device in a service transaction, makes affiliation intelligence about a user available to a service with live user consent, sends alerts to victims about identity impersonation through qualified affiliations, and simplifies on/off-boarding of users and bring your own devices (BYODs) in enterprise and cloud ecosystems. The solution is achieved through a disclosed method of watermarking user's devices for provenance, scoring users based on qualified affiliations, and dynamic data fusion with directed graphs to model attribute based relationships.

The proposed method of the disclosed system uses two types of personal identification codes (PIC) for each user—a Service Authentication Code (SAC), and a User Identification Code (UIC).

In one exemplary embodiment of the disclosed method, for access to services that require authentication the PIC is a SAC that is created by the user and known exclusively only by the user. The user's SAC is never transmitted on the wire and is not stored locally at the device or remotely at the broker, and the device watermark is generated dynamically and autonomously by the device and the broker and never transmitted on the wire, to establish proof of presence of the user at the device during the service transaction. The user's SAC and the device watermark are used to encrypt the password associated with an accessed service for use during an authentication ceremony. Unlike two-factor authentication credentials and PINs, the user SAC is not registered with an identity provider (IdP), is not part of the authentication password of the user (one time passcodes), and is used solely to encrypt the user's original authentication password. This facilitates (a) in the use of stronger passwords and periodic password changes without the burden of having to evoke hard-to-remember passwords, and (b) in blocking the use of compromised passwords by an attacker from the attacker's device.

In another exemplary embodiment of the disclosed method, for access to services that do not require authentication, the PIC is a UIC that is created by the user as a member of a group identified by an account number through a self-service portal. The UIC is encrypted by the device agent using a device pre-shared secret for transmission over a secure channel to the broker agent.

In certain exemplary embodiments of the disclosed method, where the UIC is not explicitly provided by the user at the device, the user who registered the device may be inferred from the device AIN.

The method of the disclosed system protects (a) a compromised device watermark from malicious use, from an attacker's device, by requiring the user's SAC that is known only to the user, and (b) a compromised user SAC from malicious use, from an attacker's device, by requiring the matching device watermark. Further, compromise of a device watermark would require compromise of the device pre-shared key (PSK) and a plurality of device identifiers associated with the user's registered device.

In sharp contrast to traditional brokered authentication ceremony, such as the identity provider and relying party (RP) or service provider (SP) model, the disclosed system provides an authoritative recognition of the user at the device rather than an authentication mechanism for a user based on biometric or device attributes. The user provides authentication credentials to the accessed service without having to manually enter hard-to-remember passwords for service login (sign-in). Unlike password managers, the proposed method does not store the user's (multiple) passwords in a security vault protected by a single password (locally at the user device, synchronized across the user's devices, or in the cloud) for automated authentication using form autofill. In the disclosed method, the user encrypts the passwords at the device using a user SAC known only to the user and a dynamically generated device watermark and registers the encrypted password with a broker, to generate an on-demand user token that includes the encrypted password in subsequent accesses to a service. The encrypted password can be decrypted only at the device using the dynamically generated device watermark and the user SAC known only to the user. The user may use the same SAC for all accessed services from a device, different SACs for each accessed service at a device, or different SACs at different devices for the same accessed service.

The proposed method provides the ability to resync a registered device with one click if the device identifiers change, and re-encrypt all passwords protected using the same user SAC with one click if the user's SAC is compromised on the device, without requiring all passwords to be changed. Unlike password managers, the proposed method does not generate new passwords for the user.

The proposed method provides user and device identity recognition prior to an authentication ceremony between a service provider and an identity provider.

Unlike Single Sign-On (SSO) methods, wherein a first authentication with an identity provider is the basis for a token (e.g. SAML) based second authentication with a service provider requiring an explicit second authentication, the disclosed innovation facilitates in a password based authentication ceremony without requiring the user to remember and manually enter the password in a service transaction.

Unlike an attribute exchange network that merely harvests and distributes, to a policy decision point (service provider), user and/or device assertions retrieved from commercial and/or authoritative attribute providers, the disclosed innovation constructs a directed graph comprising of entity vertices and relationship links, processes attributes as dependent or independent variables, maps the attributes to a component, and evaluates a component score and the relative impact (i.e., positive, negative or none) of the attribute in the calculus of an affiliation score for the user.

The proposed affiliation based method is not a distribution system for attributes in an information data warehouse (attribute exchange). Instead, the disclosed method serves as a scoring system based on incremental attribute relationships and impact.

The proposed identity affiliation is not an attribute based access control, but rather a score based on entity-relationships in a directed graph for post-access privilege management, wherein the entities include users, organizations, and profiles, and relationships include dependent and independent attributes of the entities.

The proposed method uses the plurality of local device identifiers and a device pre-shared key, shared by the broker with the device over a secure channel, through a hash function to dynamically generate a device watermark for device recognition rather than user authentication. The user recognition is based on the username associated with the service principal name (SPN) and the user SAC that may be associated with a plurality of passwords and a plurality of accessed services across multiple user devices. This addresses a key market challenge wherein a large cohort of users rely on multiple (and weak) passwords to access many websites and applications every day from multiple user devices (e.g. laptops/desktops at work or at home, smart phones, tablets, etc.) without using two-factor authentication or a password manager.

The method of the disclosed system provides identity affiliation based on identity recognition that comprises of at least an affiliation score, component scores, and affiliation attributes for a user with explicit user consent for distribution of requested identity affiliation during a service transaction and on-demand by the accessed service. The identity affiliation is independent of any (optional) authentication ceremony during the service transaction with the accessed service.

According to an exemplary embodiment, the present disclosure provides a method to send requested affiliations, comprising of attributes and scores, calculated using entity relationships and a dynamically constructed and traversed directed graph, of the user to a service or application, with explicit user consent, in a service transaction, wherein authentication of the user to the accessed service may be optional.

According to yet another exemplary embodiment, the present disclosure provides a mechanism for remote management services to preempt unauthorized (e.g. malicious, phishing, compromised account, etc.) access to managed devices (e.g., IoT devices in home automation systems, surveillance systems, etc.), wherein the remote management devices are watermarked and linked to managed service accounts.

BRIEF DESCRIPTION OF THE DRAWING FIGURES

The disclosure is best understood from the following detailed description when read in connection with the accompanying drawings. According to common practice, various features/elements of the drawings may not be drawn to scale. Common numerical references represent like features/elements. The following figures are included in the drawings:

FIGS. 13A, 13B and 13C are flowcharts illustrating an algorithm to generate the affiliation score, component scores and affiliations attributes for a user based on the entities and relationship objects of the directed graph, in accordance with various exemplary embodiments of the disclosed system.

FIG. 13E and FIG. 13F are tables illustrating examples of attributes harvested from a plurality of data providers for the calculus of the component and affiliation scores, in accordance with various exemplary embodiments of the disclosed system.

FIG. 14 is a flowchart illustrating a method of providing authoritative identity recognition of a user at a device to an accessed service for authentication, in accordance with various exemplary embodiments of the disclosed system.

FIG. 15 is a flowchart illustrating a method of providing an authoritative affiliation score, component scores and affiliation attributes for a user at a device to an accessed service for personalization, in accordance with various exemplary embodiments of the disclosed system.

Figure 1:
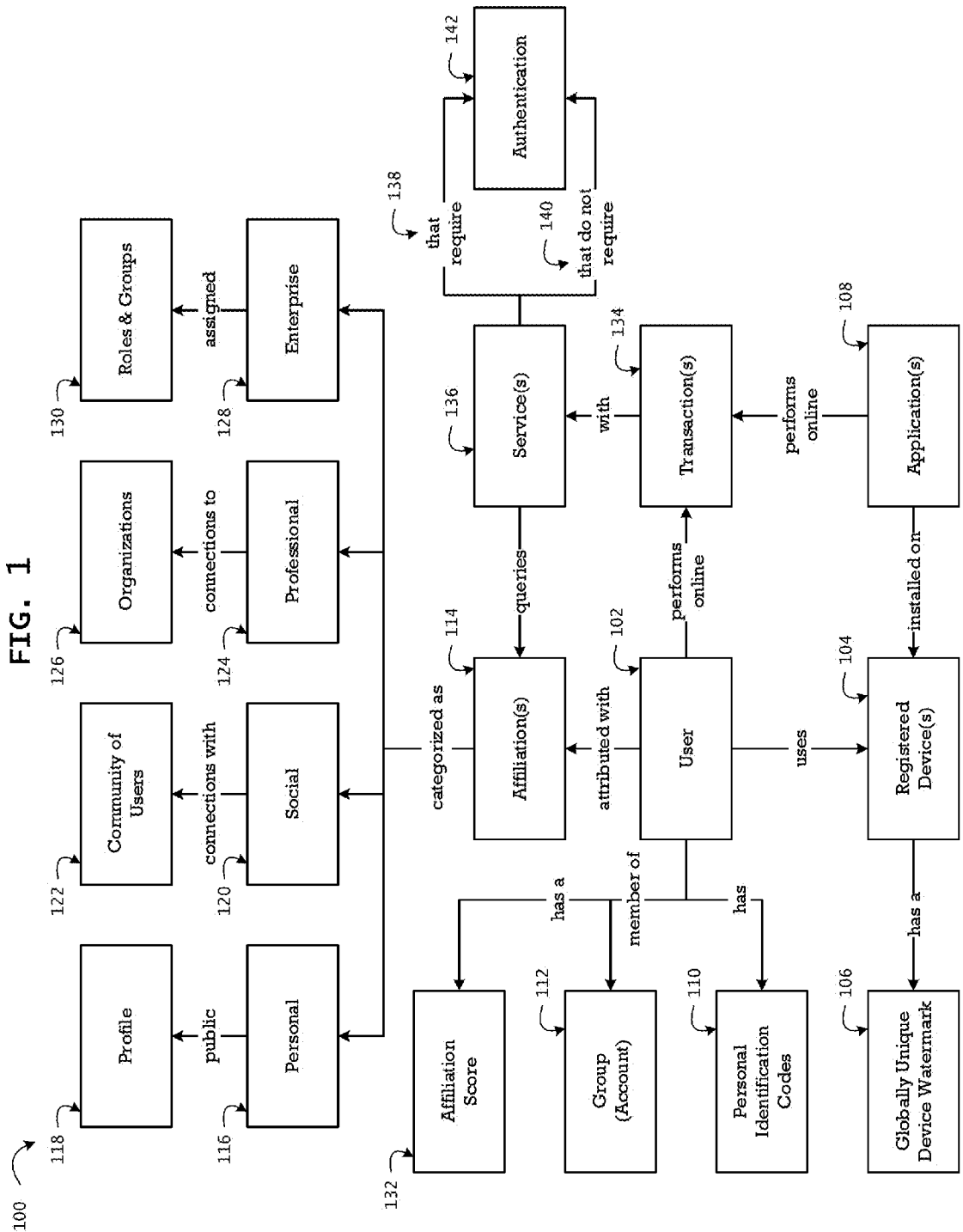
FIG. 1 is a schematic diagram illustrating a method to model entities and relationships in accordance with various exemplary embodiments of the disclosed system.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Although the disclosure is illustrated and described herein with reference to specific embodiments, the invention is not intended to be limited to the details shown herein. Rather, various modifications may be made in the details within the scope and range of equivalents of the claims and without departing from the scope of the disclosure.

The method of identity recognition is based on positive affirmation by a broker (server) of a registered device as proof of presence of the user at the identified device, and verification of the user based on a manually entered user SAC. The user SAC is never transmitted on the wire (encrypted or unencrypted) during an authentication handshake (login ceremony) or during a management session (self-service portal).

The device registration and dynamic verification is based on the group account number and a plurality of attributes and components of the device. The attributes include at least hardware identification (of the mother board or mezzanine card), Trusted Platform Module (TPM) chip identifier, processor identification, manufacturer identification, integrated resource identification (e.g. camera, monitor, keypad, mouse, pluggable device identification (e.g. USB flash drive, web camera, etc.), etc.), Bluetooth device identification, hardware configuration (e.g. memory, storage, etc.), service tags, product registrations, wireless service identifiers, geolocation by internet protocol (IP) address, registered device asset identification number (AIN), and globally unique identifier (GUID) of a domain enrolled computer. The registered device non-reputable attributes (DNA) of the device are used to dynamically generate the globally unique device watermark and the associated device AIN that remain invariant across sessions.

The globally unique device watermark is dynamically generated, by a hash function, using a device pre-shared key (PSK), shared by the broker agent with the device agent over a secure channel, and device identifiers associated with the registered device, autonomously at the device by the device agent, and at the broker agent using the device AIN. The device watermark is thereby not persisted in memory or storage on the device or at the broker.

The identification of users is based on the (group or subscription) account number, device registrations, and service profiles, wherein the passwords in the service profiles are encrypted using the device watermark and the user's SAC, and include at least a service principal name (e.g. a Uniform Resource Locator—URL or Uniform Resource Name—URN) by which a client uniquely identifies an instance of a service, a username associated with the SPN, a password, and a device AIN. The user SAC is entered locally at the device to decrypt the passwords in the service profiles for use in a transaction.

In one exemplary embodiment of the disclosed system, the PIC may comprise at least four (4) alphanumeric characters that may include both upper and lower case letters, punctuation marks, and symbols (e.g. @, &, and *). For languages other than English, alphanumeric characters include letter variations.

In an exemplary embodiment of the disclosed system, the password contained in the service profile is encrypted using the dynamically generated device watermark for the device and the user's SAC.

The user token request to the broker during a user transaction with a registered service from a registered device includes the device AIN, the account number, a timestamp, a digital signature generated using the device watermark and the timestamp, the service principal name (SPN), the username where the accessed service requires authentication or the user's UIC encrypted using the device pre-shared key where the accessed service does not require authentication, the received digitally signed service identifier via the service agent, and the accessed service host address (i.e. IP address). The user token response may include the encrypted password in the service profile that was originally encrypted during service registration using the device watermark and the user's SAC at the registered device. The encrypted password in the service profile may only be decrypted at the device using the device watermark and the user's SAC.

The user token request may be protected against replay and man-in-the-middle attacks using standard timestamp and message integrity signatures over secure channels between the device agent and the broker agent.

The identity recognition in a live transaction requires the user's PIC and a one-time user token (issued by the broker based on verification of the device watermark) linked to the service profile to authenticate the recognized user to the service, with optional affiliation context comprising of an affiliation score, component scores and categorical affiliation attributes. The one-time user token may include either the encrypted password or a pre authentication token of the user.

The identity affiliation based on identity recognition is established by processing, as a directed graph, a variety of large datasets harvested from a plurality of third party authoritative data providers (data sources), and queried by one or more of a user name, an address, a telephone number, and the last 4 digits (or alphabets) of a federal, state, or local government issued identification number (e.g. social security number (SSN), taxpayer identification number (TIN), passport, driver's license, identification card, etc.). The received datasets include user profile information (attributes), such as memberships in public or private organizations, credit history, proof of insurance, civic records, health records, property ownership, employment history, education records, subscriptions to utility services (gas, electric, and cable), etc. The queries are also directed to receive datasets relating to organizations a user may be associated (linked) with that include organization profile information (attributes) such as company ranking, revenues, employees, sector, etc. The purpose of identity affiliation, post identity recognition, is to adequately qualify associations (relationships) of the user to a plurality of independent and trusted nodes (entities that may comprise of other users and organizations) to establish authoritative and referential integrity based on the user profile.

The proposed method of identity provenance based affiliation provides an open services interface and architecture for affiliation aware filtering, streaming and customization of content for a user. The approach transcends complex role based access controls in cross realm/domain applications, eliminating administrative overheads for content providers in cyber space.

The proposed method of identity recognition and affiliation in an online (web) transaction significantly reduces the risks and advanced threats posed by password compromise, delegation and/or impersonation of a user by landed malware, and facilitates traceability of the user's managed or unmanaged device and location associated with a staged cyber-attack. Impersonation flows the user's identity to back-end resources on the same computer. Delegation flows the user's identity to back-end resources on computers other than the computer running the service.

The method of establishing affiliations between registered users of the Identity Recognition and Affiliation (IRA) service requires explicit consent of the user to accept an affiliation to detect identity theft. A registered malicious user ($U_m$) may assume the identity of a victim user ($U_v$) using the victim's name, compromised email password, and/or contact telephone number. When user $U_m$ connects to another registered user ($U_r$) to establish an affiliation by impersonating user $U_v$, there are at least two (2) methods to detect the malicious user $U_m$. The registered user $U_r$ receives an affiliation invite along with user $U_v$ information including at least the name, telephone number, and email address of the victim user $U_v$ as impersonated by the malicious user $U_m$. The registered user $U_r$ may ascertain whether user $U_v$ sending the affiliation invite is a person of acquaintance and if so whether any received user $U_v$ information is indeed that of the acquaintance. The registered user $U_r$ may contact the acquaintance $U_v$ to confirm whether the invite was indeed initiated by the acquaintance before accepting the invite. Concurrently, the victim user $U_v$ receives an alert message, by email, text or phone to be notified about the affiliation invite initiated to registered user $U_r$, even where the victim user ($U_v$) may not be a registered user of the IRA service. The disclosed method of consent-based affiliations therein provides a way to detect identity theft and dispatch alerts to a community of victims who are not registered users of the IRA service.

The affiliation score of a user is a qualitative and quantitative measure of the diversity of qualified attributes and relationships determined based on information available to the broker about the user. The affiliation score is derived based on a plurality of component scores, wherein each component score is further determined based on relative weights and categorization of associated attributes received from multiple data sources about the user. There are at least four basic categories (logical grouping) of affiliations: personal, social, professional, and enterprise. Within each category, there are a plurality of component scores possible based on associated attributes, for example, reference score, honorary score, utility score, civic score, education score, insurance score, finance score, employment score, travel score, health score, property score, service score, etc.

The privacy of the user's personal information (i.e. user profile) is secured by encrypting the data first at the user's device with the SAC of the user that is only known to the user (i.e. not persisted on the user's device), and subsequently further encrypting the data at a remote server with a server platform identification number (PIN) that is generated dynamically (i.e. not persisted on the remote server) based on user profile information and server hardware entropy. This provides two layers of protection for user's data-at-rest (i.e. on persistent storage).

The calculus for the affiliation score uses directed graph theory with a set of objects (nodes) connected together where all the edges (links) are directed from one node to another and functional/homomorphic encryption used for obfuscation. The broker service harvests a variety of user attributes from a plurality of authoritative data sources through directed queries for a user. The user attributes, which may be cached in a repository, include information across personal, social, professional, and enterprise domains. The user's static and association attributes are used to construct a dynamic directed graph to represent entities as nodes and relationships as links. Entities include a community of users, social networking connections, organizations, roles, and groups. The relationships represent an association type (e.g. parent, sibling, child, employer, employee, member, colleague, friend, advisor, contact, vendor, contractor, supervisor, student, client, doctor, landlord, banker, partner, agent, coach, teacher, tutor, associate, intern, etc.) or a profile type (e.g. finance, reference, education, civic, insurance, honorary, employment, utility, property, travel, health, service, etc.). The directed graph is traversed to calculate a plurality of component scores based on a score criteria and a score function. The score function computes a weighted score for each of the entities and relationships matching the score criteria.

The affiliation score calculation is based on hierarchical, non-hierarchical (e.g. lateral, peer to peer), cyclic, and non-cyclic interdependencies between entities (e.g. user and non-user objects). Each node is an entity (e.g. user, organization, profile, etc.) and may optionally be assigned attributes. Each link represents a relationship with assigned attributes that have a static or dynamic absolute score. The absolute score of an entity is unconditional and may be assigned by a data provider or calculated by directed graph traversals. The affiliation score calculation for a user entity is a conditional score based on weighted absolute scores of other entities and relationships in the directed graph.

The device may be any type of hardware appliance including, for example, a laptop, desktop, tablet, smart phone, server, IoT device, etc.

The broker agent may send email, text, or voice based event notifications to the registered user about successful and failed authentication attempts to access a registered service from a registered device, including information about the date and time of the episode, device, geo-location, and service profile.

The harm caused by lost or stolen devices in a virtualization and cloud centric ecosystem, where users are increasingly migrating their private data and applications to, is enormous. The credentials cached (remembered) by the web browser and passwords saved in a document pose a bigger risk as an attacker could exploit these credentials now in their possession to access the user's online data.

In one exemplary embodiment of the invention, a lost or stolen registered device is protected by (a) requiring knowledge of the user's PIC that is only known to the user; (b) a lockout after a set limit on incorrect PIC entry; and (c) a notification of the episode to the user by the broker agent on use of an incorrect PIC.

In another exemplary embodiment of the invention, a lost or stolen registered device is protected by deregistering the device through a self-service management portal accessed by the account manager using the (group or subscription) account number and account password or the registered user's username and user password.

Attributes harvested through directed queries to a plurality of data sources, including data exchanges, public organizations, private organizations, background check engines, published reports, ratings bureaus, etc. may be processed by the broker service to generate derivative attributes. As examples, (a) age group attributes may be derived from age; (b) credit status attributes may be derived from the FICO score; (c) good student attributes may be derived from a college grade; (d) professional engineer attributes may be derived from certifications; and (e) good driver attributes may be derived based on citations.

The fraction coefficients in an equation or function in a calculus of score may be generated by (a) empirical evidence; (b) applying statistical regression using attributes harvested in the broker repository; (c) industry standards; or (d) applying a uniform distribution.

Referring to FIG. 13E and FIG. 13F, at blocks 1366 and 1368 the attributes table provides examples to illustrate the types of affiliation attributes that are harvested (retrieved by query) from a plurality of data providers (sources) including the member (user), classified by category, and mapped to a component. The component score may be calculated as a static or dynamic score, based on a discrete (constant) value, a ranking (grading) equation, a weighted equation (normalization), or a multi attribute function (grammar expressions). The attributes may be independent of, or dependent on, other association or profile based attributes of a component. The impact signifies whether an attribute has a positive, negative, or no effect on the component score and consequently on the affiliation score. The extensibility of attributes in the present disclosure will be readily appreciated by one of ordinary skill in the art from the illustrated table.

Ranking Equation for Score Calculus $S_{re}=\Sigma(\beta_n*t_n[a_n])$ where $\beta$ is a fraction coefficient, $\Sigma\beta_n=1$, and $t_n$ is a lookup table containing the rank score $r_n$ for attribute an. For example, the education score may be calculated based on college, degree, and grade attributes wherein the ranks $r_n$ are based on colleges attended (published college rankings), accreditation of the degree, and grade scored. For example, the finance score based on a FICO score may be ranked as excellent (760-850), very good (700-759), good (660-699), not good (620-659), poor (580-619) or very poor (500-579).

Weighted Equation for Score Calculus $S_{we}=\Sigma(\beta_n*e_n(a_n))$ where $\beta$ is a fraction coefficient, $\Sigma\beta_n=1$, and $e_n$ is a mathematical expression that determines a static score for an independent attribute an. For example, the employment score may be calculated based on company ranking, employees, revenues, job position, and years of service.

Multi Attribute Function for Score Calculus $S_{maf}=\Sigma(\beta_n*f(\{a_1, a_2, \ldots, a_m\}))$ where $\beta$ is a fraction coefficient, $\Sigma\beta_n=1$, and f is a program function that calculates a static score for a set of dependent attributes $\{a_1, a_2, \ldots a_m\}$. For example, the property score may be calculated based on multiple properties the user may be linked with and the status (owner, renter, or foreclosure), and the city and state, as the property valuation is dependent on location. Further, the impact may vary per property based on status.

Component Score Calculation $S_c=\Sigma S_{(l)(a)}$ where $S_{(l)(a)}$ is the score for attribute (a) of link (l) in the directed graph traversal mapped to component c.

Affiliation Score $S_a=\Sigma(\beta_n*S_{c(n)})$ where $\beta$ is a fraction coefficient, $\Sigma\beta_n=1$, and $S_{c(n)}$ is the calculated score for component n.

The following real-world applications, vulnerable to exploits with a user's compromised password, benefit from the proposed authoritative identity recognition and affiliation method.

1) A user initiates an online transaction with a web service that requires trustworthy authentication without the use of an external physical two-factor authentication device.
2) A user initiates an online transaction with a web service that does not require explicit authentication (the user remains anonymous) but requires trustworthy affiliation attributes of the user for access and/or content management.

3) A user requires a solution that manages multiple passwords locked to device provenance and service instance (identifier) verification.
4) An online application requires a dynamic affiliation score and/or a component score of a user in a session.
5) An online application requires dynamic affiliation attributes of a user in a session for personalization of content.
6) An online application requires access management controls to restrict users by anonymized identity profile (e.g. age-appropriate, child-safe, criminal records, group associations).
7) A conferencing or social networking application requires dynamic affiliation to identify and establish a private group in a cohort of participants.
8) A web meeting application requires device watermarking and identity recognition to ascertain authoritatively that only invitees of a private group join the web meeting, and that no eavesdroppers are exploiting a forwarded web meeting invite.
9) An application installed and executing locally on a device as a client application requires device watermarking and identity recognition to allow the user to authenticate without having to remember or manually enter passwords.
10) An application installed and executing locally on a device as a client application requires a dynamic affiliation score, a component score, and/or attributes of the user for feature activation or capability.
11) A remote management service for IoT devices (home automation systems, industrial automation systems, surveillance systems, etc.) requires device watermarking and identity recognition of service accounts (passwords) to prevent unauthorized remote access by breach of a service account (password).
12) Simple Authentication and Security Layer (SASL) enabled client-server applications require device watermarking and identity recognition to allow users to authenticate without having to remember or manually enter passwords. In one exemplary embodiment, an IRA plugin for the SASL application provides such a capability.

Referring to FIG. 1, a user 102 uses a plurality of devices, wherein a registered device 104 has a dynamically generated globally unique device watermark 106. A plurality of applications 108 may be installed on the registered device 104. An application 108, such as for example a web browser, installed on the registered device 104 performs an online transaction 134 with a service 136 that may require (138) authentication 142 (i.e. sign in), such as, for example, a web based email service, or with a service that does not require (140) authentication 142, such as, for example, an online news website. The service 136 may query affiliations 114 that are attributed with the user 102 that is performing the online transaction 134 with the service 136. The user 102 has two types of personal identification codes (PIC) 110—a service authentication code (SAC) and a user identification code (UIC). The user 102 may also have an affiliation score 132 and may be a member of a group (account). The affiliations 114 may be categorized as personal 116, social 120, professional 124, or enterprise 128. The personal affiliations 116 may be based off a public profile 118. The social affiliations 120 may be based on connections with a community of users 122. The professional affiliations 124 may be based on connections to organizations 126. The enterprise affiliations 128 may be based on assigned roles and groups 130 in an identity management system, such as, for example, a directory of an authentication system.

Figure 2:
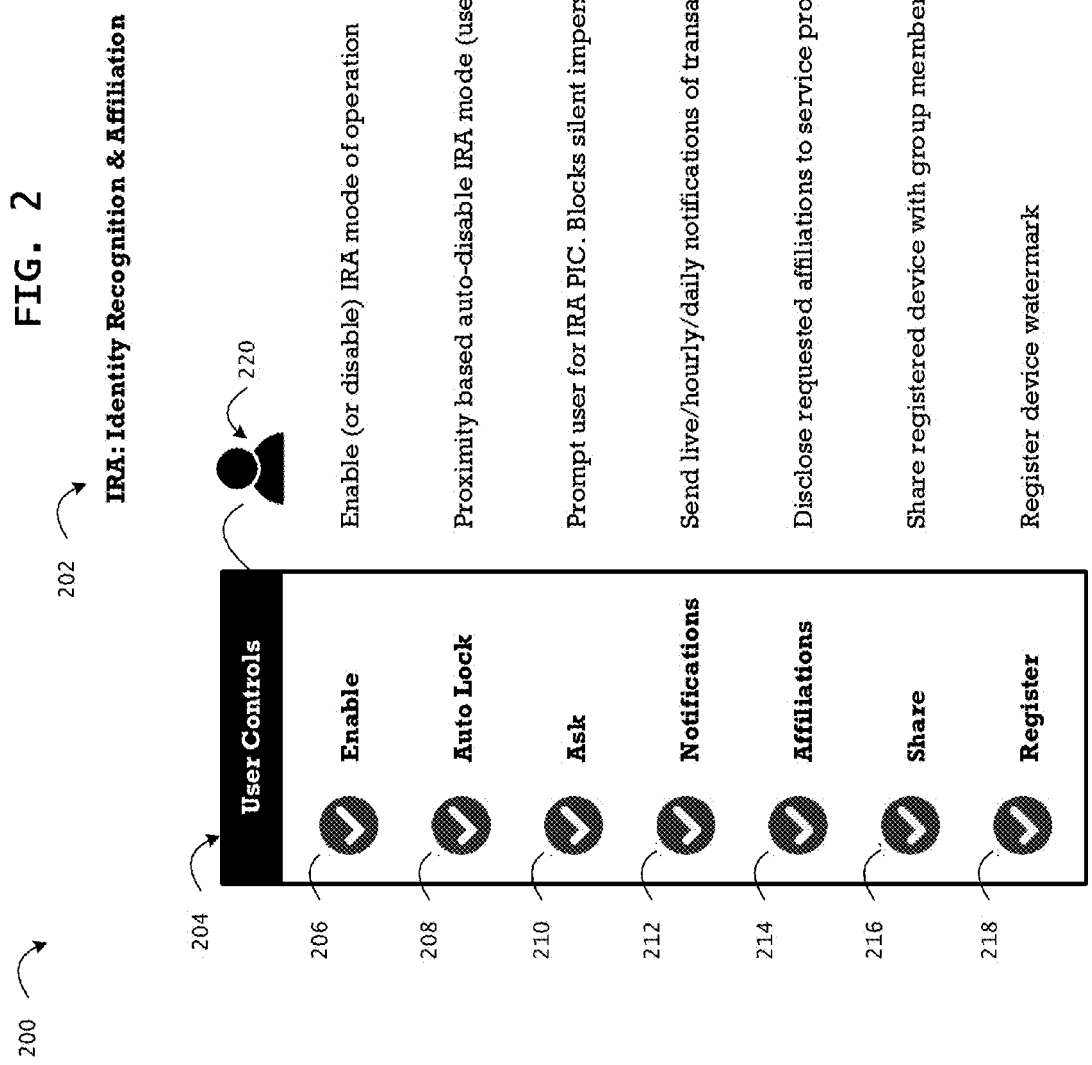
FIG. 2 is a graphical representation of an interface for user control and consent in accordance with various exemplary embodiments of the disclosed system.
Figure 3A:
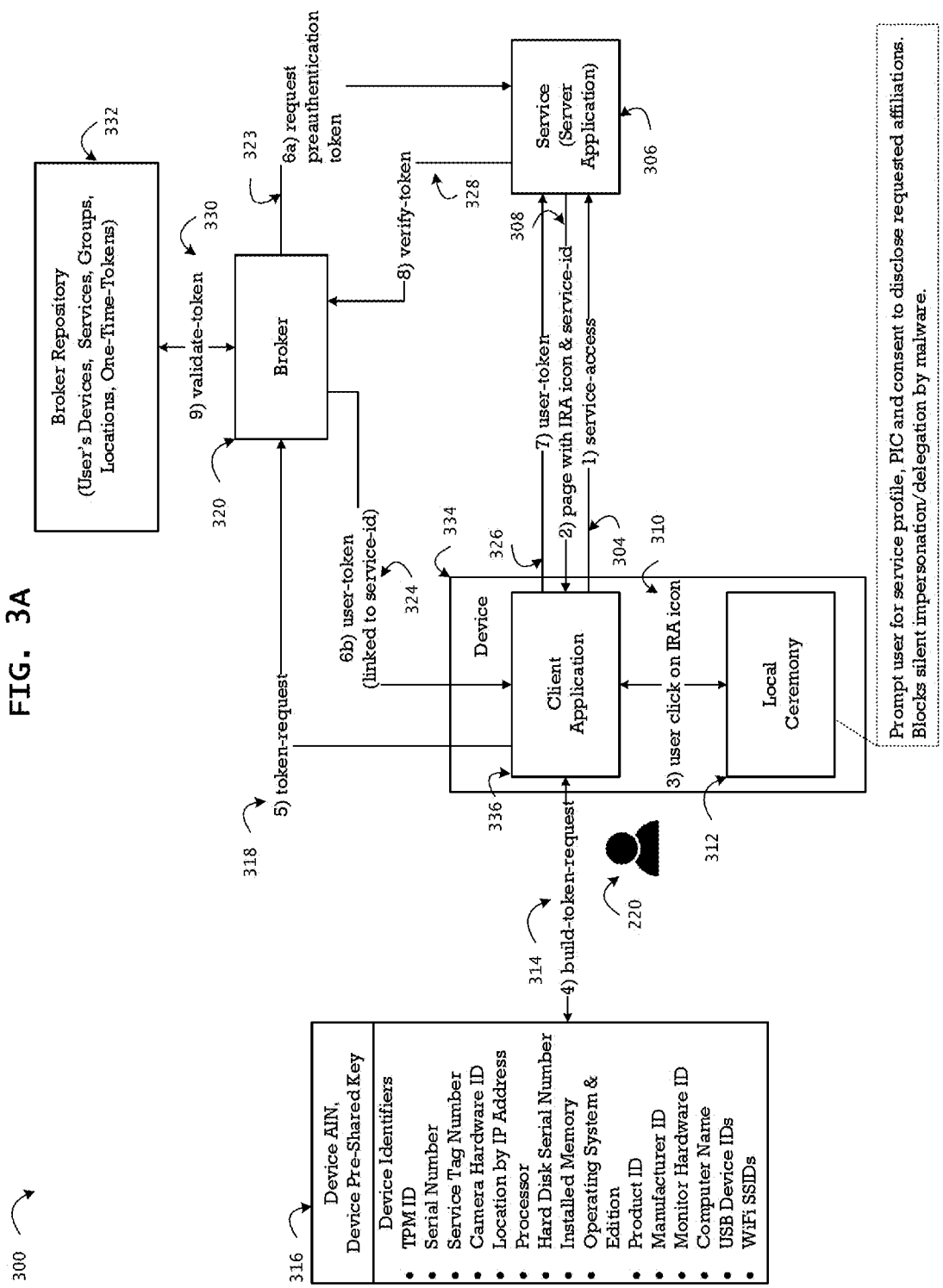
FIG. 3A is a schematic diagram illustrating interactions and control flows between components of the model in accordance with various exemplary embodiments of the disclosed system.

Referring to FIG. 2 and FIG. 3A, the user 220 is provided a set of user controls 204 at the registered device 104 to manage (toggle) the Identity Recognition and Affiliation (IRA) mode 202 of operation. Control 206 enables the IRA mode of operation so that the user 220 does not have to remember or manually enter passwords on access to a service that requires authentication, or disables the mode to allow user 220 to switch to explicit use of passwords through manual entry. Control 208 provides a proximity based auto disable of the IRA mode of operation as a security locking mechanism when the user 220 is away from the registered device. Control 210 always asks (prompts) the user 220 for the IRA PIC (SAC or UIC) on each attempted service access to block silent impersonation or delegation by malware (in stealth) of the user's credentials. Control 212 sends live, hourly, or daily notifications of transactions as email, text, and/or popups. Control 214 allows the user 220 to provide explicit consent to disclose requested affiliations to the service provider on user access to the service. Control 216 allows the user 220 to share the registered device with other members of the group account. Control 218 allows the user 220 to register or deregister the device 334 with the broker 320.

Referring to FIG. 1 and FIG. 3A, the service 306 generically represents alternate embodiments of services 136 that require (138) or that do not require (140) authentication 142.

Figure 11:
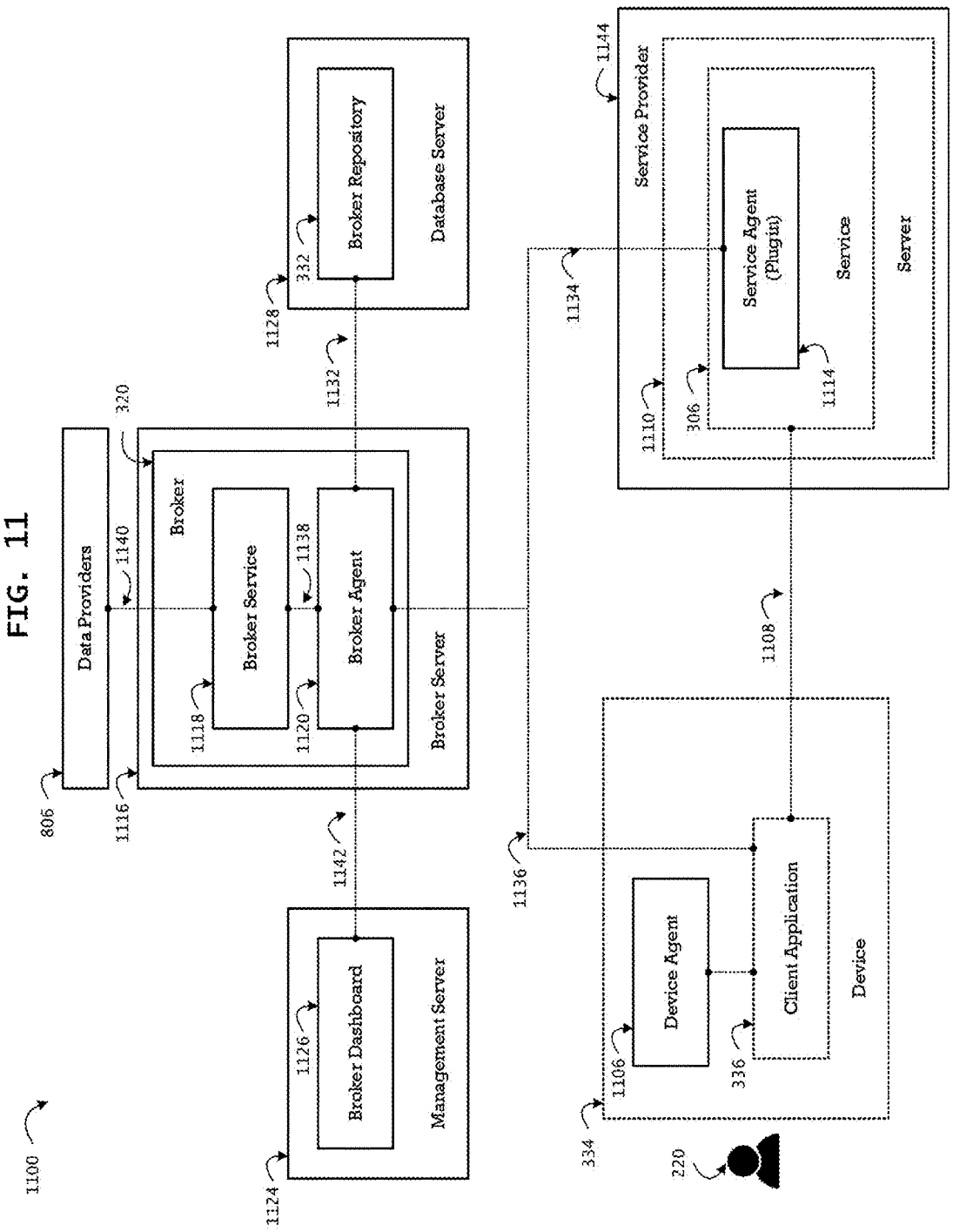
FIG. 11 is a schematic diagram illustrating interactions and control flows between the user, device, broker, and service agents of the model, in accordance with various exemplary embodiments of the disclosed system.

Referring to FIG. 3A and FIG. 11, at block 304, a user 220 at a device 334 instrumented with the device agent 1106 uses a client application 336 (e.g. a web browser or application) to initiate a service access request to a service 306. At block 308, the service 306 returns a web response page that includes an IRA service icon, a service identifier, and optional affiliation requests. The page is rendered at the device 334 to the user 220 by the client application 336. At block 310, the user clicks on the IRA service icon to commence a local ceremony 312 where the user 220 is prompted to provide a service profile, a PIC (SAC or UIC), and consent to disclose requested affiliations to the service 306. At block 314, upon user 220 submission of the page a user token request is built by the client application 336 using dynamic device identifiers 316, wherein the identifiers may include the hardware identification (of the mother board or mezzanine card), Trusted Platform Module (TPM) identifier, device serial number, service tag number, camera hardware identifier, geo-location by IP address, processor identification, hard disk serial number, installed memory, operating system and edition, product ID, manufacturer ID, monitor hardware ID, computer name, USB device IDs, and WiFi SSIDs. At block 318, a user token request is generated and sent to the broker 320. At block 324, the broker 320 processes the request from the client application 336 to validate the authenticity of the received service identifier and associated fully qualified domain name (FQDN) of the service 306 determined from the received service host address. A one-time user token, that is linked to the service identifier included in the user token request, is generated. The generated one-time user token is sent to the client application 336 on the user's device 334. At block 326, the received user token is processed to complete and submit the received page along with the user token to the service 306. The encrypted password received from the broker in the user token at block 324 is consumed by the client application 336 to complete form-based authentication and is not forwarded to the service 306. At block 328, the service 306 may send a user token verification request to the broker 320. At block 330, the broker 320 validates the received one-time user token by referencing static configuration and dynamic operations metadata in the broker repository 332.

In an exemplary embodiment of the disclosed system, the timestamp in the user token request may be generated locally at the device configured for network time synchronization, or received from the broker agent during the initial SSL handshake (e.g. server hello message) between the device agent and the broker agent.

In one exemplary embodiment of the disclosed system, at block 308 the service identifier is encrypted using the private key of the server 1110 in FIG. 11 hosting the service 306.

In one exemplary embodiment of the disclosed system, at block 323 the broker 3220 requests a pre authentication token (for example, using the OAuth, OpenID, SSO, or Kerberos protocol) from the service 306 by sending an authenticator containing at least a secret key issued for the broker 320 by the service provider 1144, the username of the user 220, an optional timestamp, and optional IP address of the device 334. At block 324, the user token includes a pre authentication token issued to the broker 320 by a service 306 for the user 220. When a pre authentication token is included, no password is required and just a valid username is adequate to authenticate the user 220 to the service 306. The pre authorization token may be issued for one-time use only or for a session duration. The pre authentication tokens for the user 220 may be stored in the broker repository 332 with a set expiration date and time based on session duration.

In one exemplary embodiment of the disclosed system, the broker 320 may issue a single user token for identity recognition and affiliation, or issue split user tokens—one user token for identity recognition and one use token for identity affiliation.

Figure 3B:
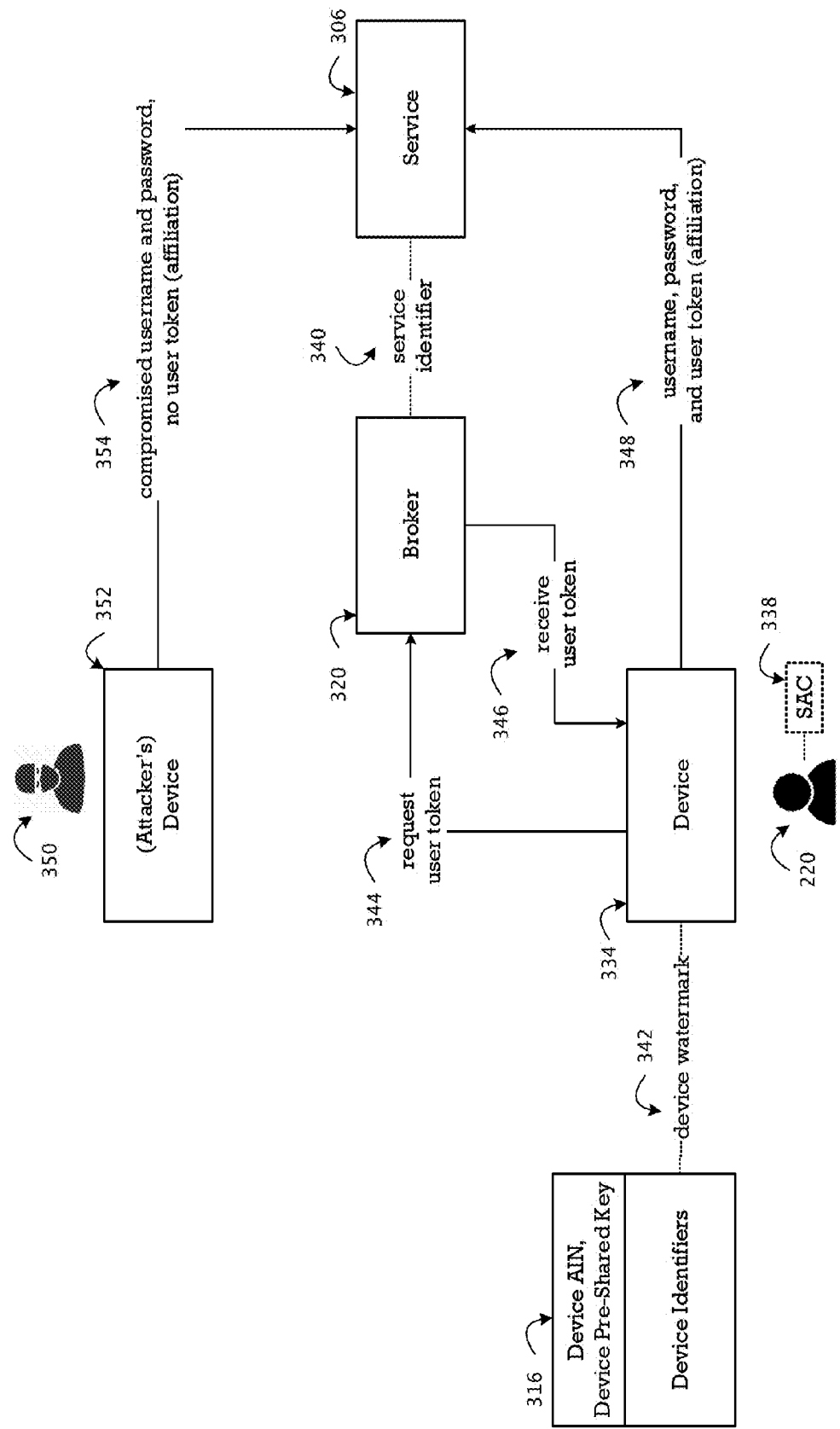
FIG. 3B is a schematic diagram illustrating the method of identity recognition and affiliation to grant a user access to a service requiring authentication, and to deny an attacker impersonating the user with compromised credentials access to a service requiring authentication, in accordance with various exemplary embodiments of the disclosed system.

Referring to FIG. 3B, FIG. 3A and FIG. 11, the user 220 accesses a service 306 that requires authentication to grant user access. The user 220 provides the SAC 338 for the client application 336 to request a user token 344, wherein, on the user's device, the method of token request creation requires the dynamically generated device watermark 342, the device pre-shared key, the device AIN, and the service identifier 340 issued to the service 306 by the broker 320 received at block 308. The broker 320 verifies the received service identifier encrypted with the private key of the service provider 1144, and, only upon successful verification (that preempts phishing attacks) with the associated public key, generates and issues a user token with the affiliation information and encrypted password for decryption at the user's device 334 with the device watermark and the user's SAC. At block 348, the username, the decrypted password, and the user token are forwarded to the service 306 over an encrypted secure channel (e.g. HTTPS) with extended validation of the server certificate.

At block 354, an attacker 350 at a device 352 in possession of the compromised username and password of user 220 attempts to authenticate with service 306 without the user token. The service 306 may deny authentication based on requiring a user token with affiliation information for identity recognition prior to authentication.

At block 354, an attacker faces a tremendous challenge to impersonate (a) the user's dynamic device watermark that is not stored at the user's device 334 or at the broker 320, (b) a plurality of device identifiers 316 locked to the user's device 334, (c) the user device pre-shared secret, (d) the device agent hash function, and (e) the user's SAC 338 known only to the user, to generate a malicious one-time user token that requires back-channel validation 330 by the broker 320.

Figure 3C:
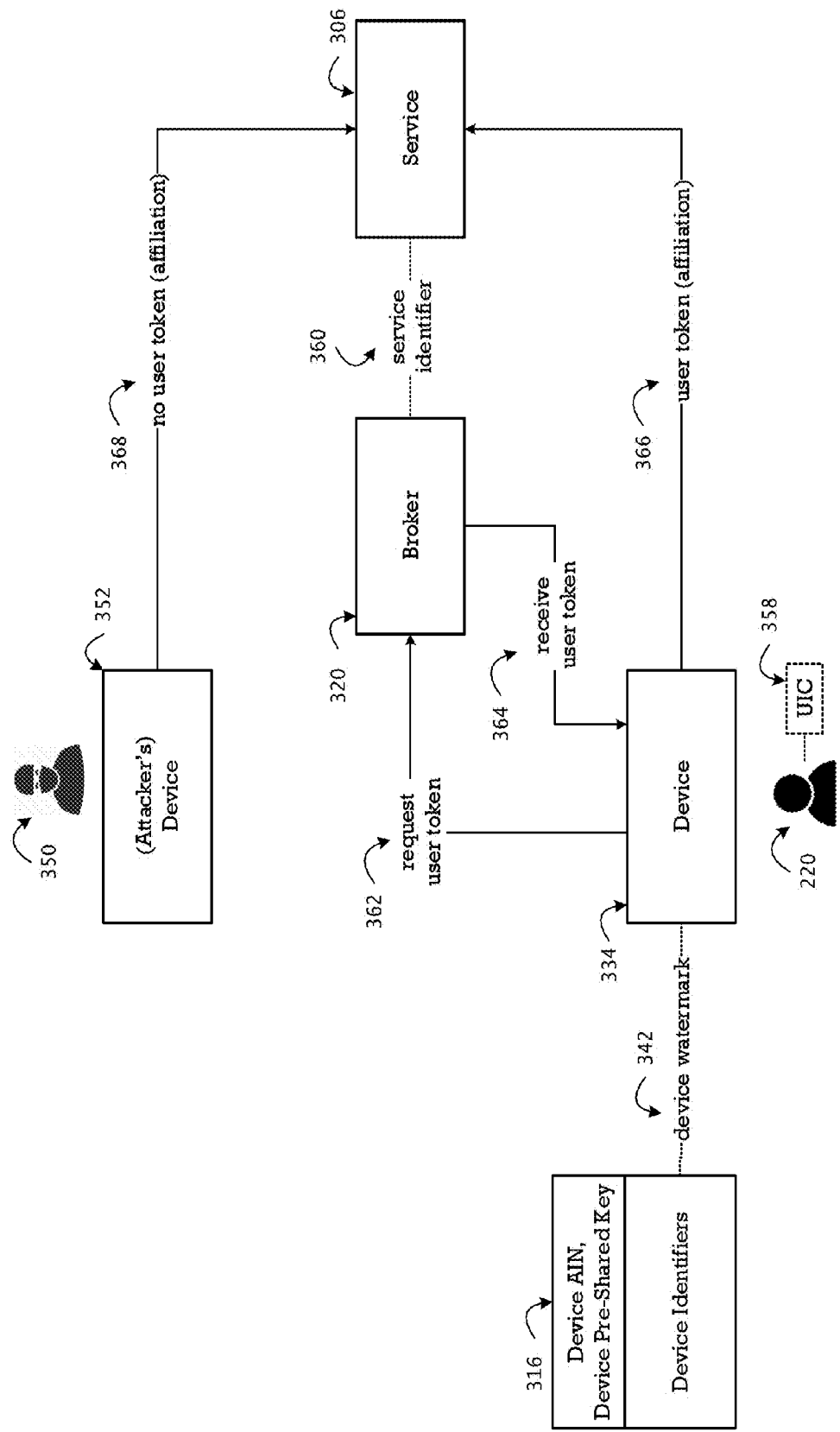
FIG. 3C is a schematic diagram illustrating the method of identity affiliation to grant a user access to a service that does not require authentication, and to deny an attacker impersonating the user access to a service that does not require authentication, in accordance with various exemplary embodiments of the disclosed system.

Referring to FIG. 3C, FIG. 3A and FIG. 11, the user 220 accesses a service 306 that does not require authentication to grant user access. The user 220 provides the UIC 358 for the client application 336 to request a user token 362 wherein on the user's device the method of token request creation requires the dynamically generated device watermark 342, the device pre-shared key, the user's UIC, and the service identifier 360 issued to the service 306 by the broker 320 received at block 308. The broker 320 verifies the received service identifier encrypted with the private key of the service provider 1144 and only upon successful verification (that preempts phishing attacks) with the associated public key generates and issues a user token with the affiliation information. At block 366, the user token is forwarded to the service 306.

At block 368, an attacker 350 at a device 352 attempts to access service 306 without the user token. The service 306 may deny access based on requiring a user token with affiliation information for identity affiliation. For example, watering hole attacks may be preempted by requesting affiliation information to establish whether the user attempting to access the website has a qualified affiliation with members of a group.

Figure 4A:
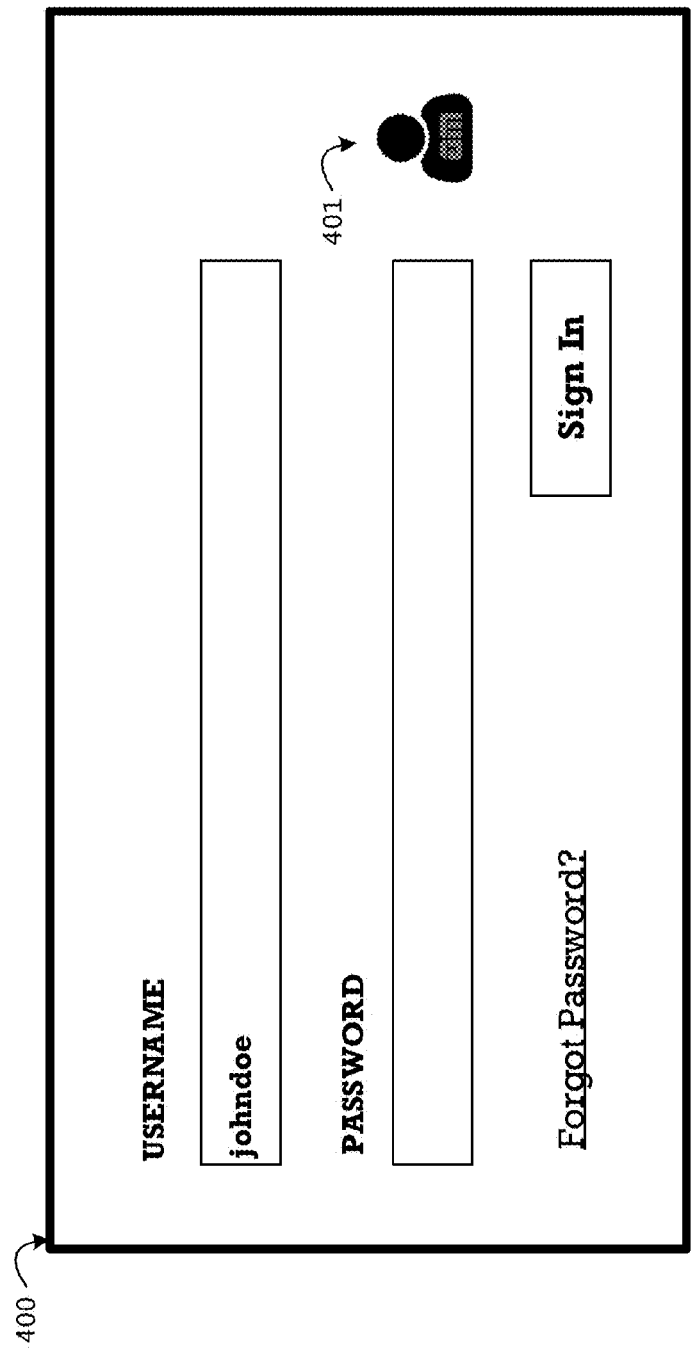
FIGS. 4A and 4B are a graphical representation of an interface for user visibility and consent for authentication and affiliation in accordance with various exemplary embodiments of the disclosed system.

Referring to FIG. 4A, at block 400, a user 220 accesses the sign-in (form based authentication) page of a service 306 that requires authentication 138. The user 220 first enters the username (e.g. login identifier, email address, phone number, etc.). Then, the user 220 clicks on the IRA service icon 401 to initiate the IRA mode of operation.

In an alternate embodiment of the disclosed system, the IRA service icon 401 may be displayed on a web page other than a login page, such as on a landing page or navigated page, for a service that does not require authentication 140.

Figure 4B:
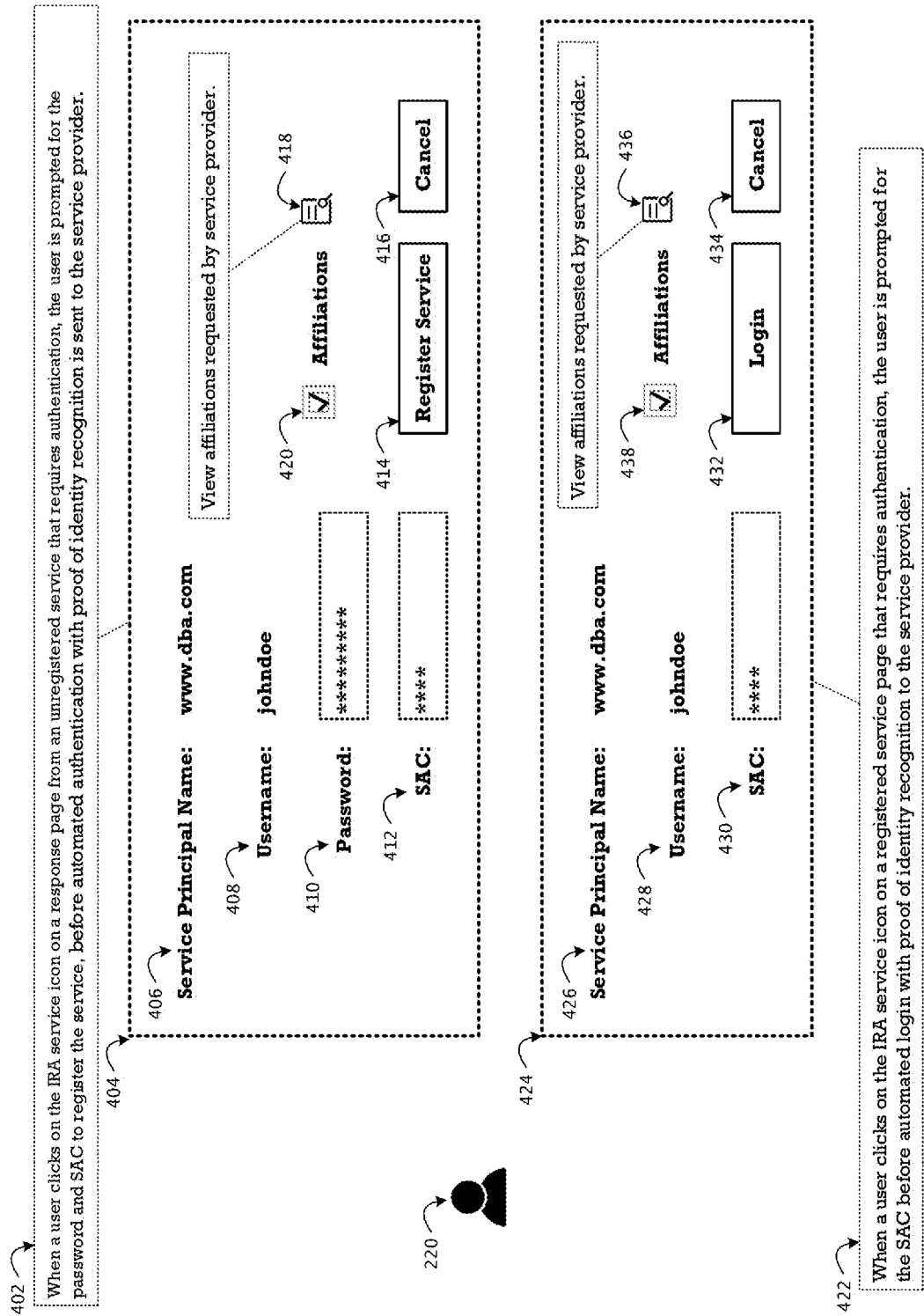

Referring to FIG. 4B, at block 402, a user 220 enters a username and clicks on the IRA service icon 401 displayed by the client application 336 at the device 334 on a web response page from a service, not yet registered by the user as a service profile, that requires explicit authentication. The client application 336 prompts the user 220 to register the service profile before the authentication credentials with proof of identity recognition and requested affiliations are sent to the service 306 by means of a one-time user token.

At block 404, the service principal name 406 inferred from the accessed service URL and the username 408 are displayed to the user 220. The user 220 is prompted to enter the password 410 and the user SAC 412 based on user controls 204, and, with the icon 418 to view affiliations, if any, requested by the service 306, interact with a checkbox 420 to allow or deny sending the affiliations, and then to register the service 414 or cancel the access 416.

At block 422, a user 220 enters a username and clicks on the IRA service icon displayed by the client application 336 at the device 334 on a web response page from a service 306, already registered by the user with a service profile, that requires explicit authentication. The client application 336 prompts the user 220 before the authentication credentials for the registered service profile with proof of identity recognition and requested affiliations are sent to the service 306 by means of a one-time user token.

At block 424, the service principal name 426 inferred from the accessed service URL and the username 428 are displayed to the user 220. The user 220 is prompted to enter the user SAC 430, as set at 412 during service registration at 414 and based on user controls 204, and, with the icon 436 to view affiliations, if any, requested by the service 306, interact with a checkbox 438 to allow or deny sending the affiliations, and then to login 432 or cancel the access 434.

Figure 5:
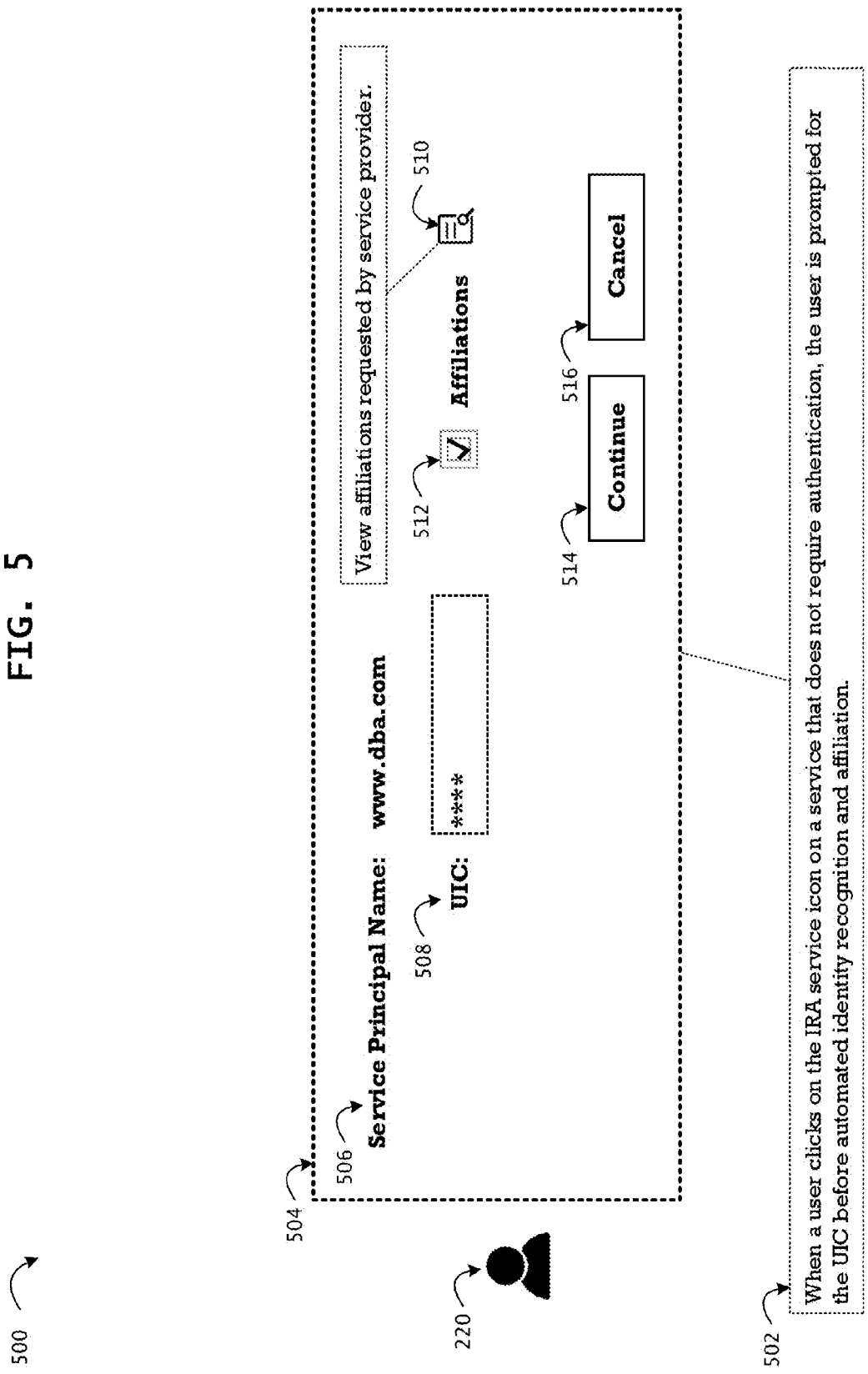
FIG. 5 is a graphical representation of an interface for user visibility and consent for affiliation in accordance with various exemplary embodiments of the disclosed system.

Referring to FIG. 5, in an alternate embodiment, at block 502, the user 220 clicks on the IRA service icon displayed by the client application 336 at the device 334 on a web response page from a service 306 that does not require any authentication. The client application 336 prompts the user 220 before any requested affiliations are sent to the service 306 by means of a one-time user token.

At block 504, the service principal name 506 inferred from the accessed service URL is displayed to the user 220. The user 220 is prompted to (optionally) enter the user UIC 508 based on user controls 204 and, with the icon 510 to view affiliations, if any, requested by the service 306, interact with a checkbox 512 to allow or deny sending the affiliations, and then to continue 514 or cancel the access 516. If no explicit UIC 508 is provided, the user associated with the registered device is implicitly inferred as the user.

Figure 6:
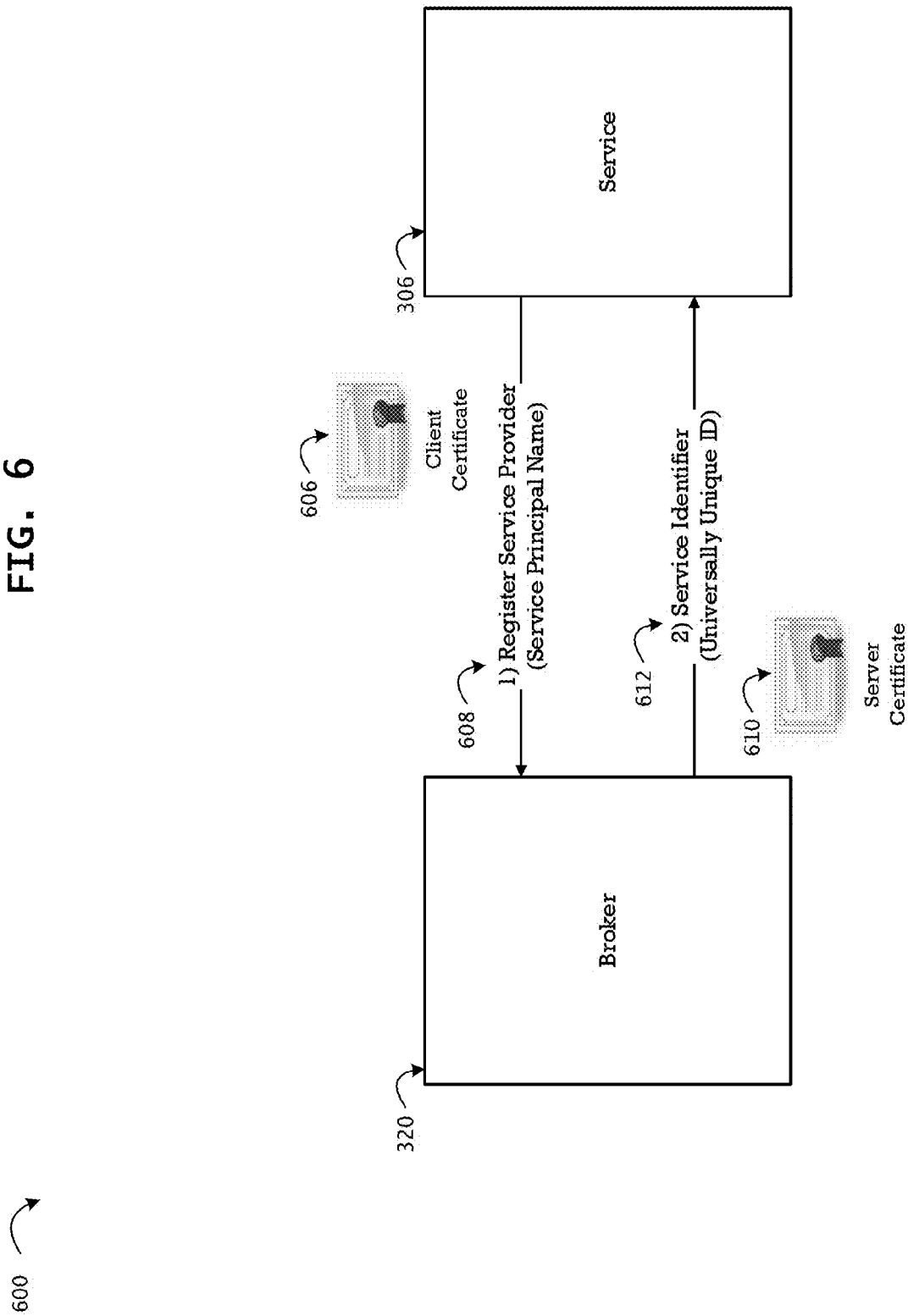
FIG. 6 is a schematic diagram illustrating interactions and control flows between the broker and the service provider of the model in accordance with various exemplary embodiments of the disclosed system.

Referring to FIG. 6 and FIG. 11, at block 608, the service 306 registers using the service principal name (SPN) with the broker 320. The client certificate 606 of the server 1110 hosting the service 306 and server certificate 610 of the broker server 1116 hosting the broker 320 are used to establish a mutually secured connection using Secure Sockets Layer (SSL) or Transport Layer Security (TLS). At block 612, the broker 320 generates and returns a universally unique service identifier linked to the fully qualified domain name (FQDN) of the server 1110.

Figure 7:
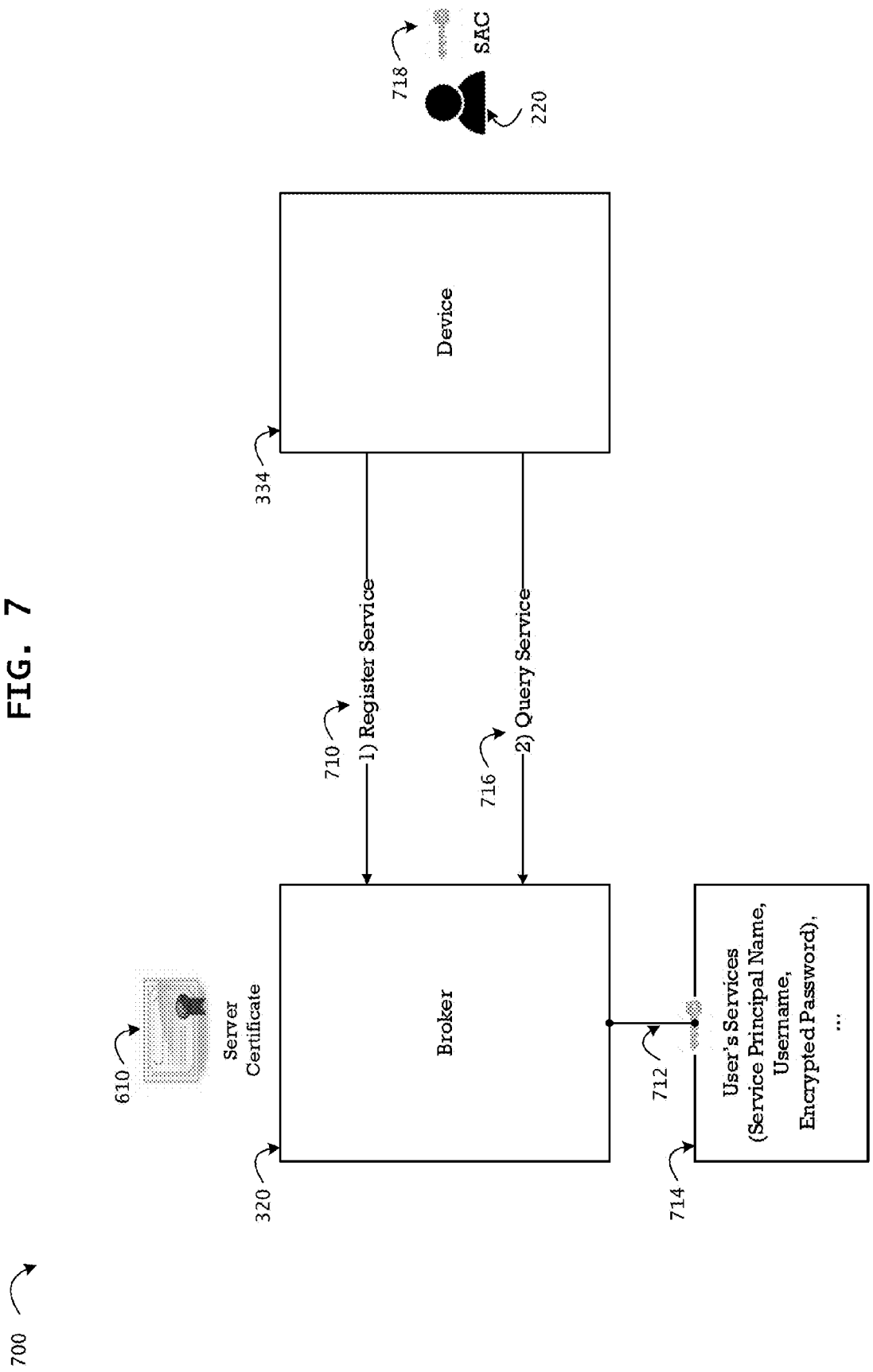
FIG. 7 is a schematic diagram illustrating interactions and control flows between the broker and the user device of the model in accordance with various exemplary embodiments of the disclosed system.

Referring to FIG. 7, at block 710, the user 220 at device 334 registers a service profile with the broker 320 over a secured connection (using SSL or TLS) using the server certificate 610 of the broker server 1116. The password in the service profile is encrypted at the device 334 by the client application 336 using the device watermark and the user's SAC 718 prior to being transmitted to the broker 320. At block 712, the registered service profile 714 of user 220 is further encrypted using the hardware key of the broker server 1116 and stored in the broker repository 332. At block 716, the client application 336 at the device 334 may query for the registered service profile of a service 306 on access by the user 220 to the service 306.

Figure 8:
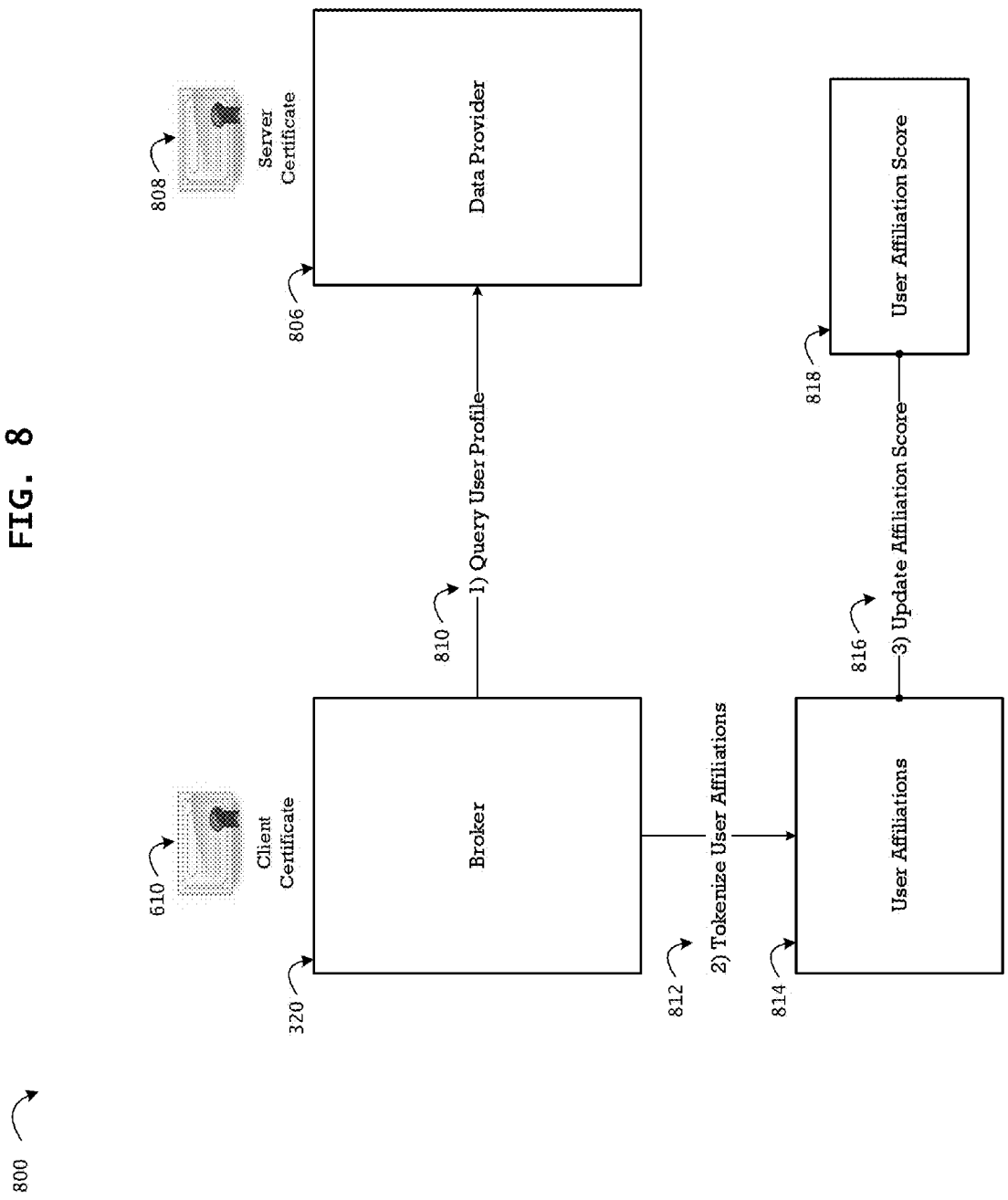
FIG. 8 is a schematic diagram illustrating interactions and control flows between the broker and the data provider of the model, to calculate the affiliation score, in accordance with various exemplary embodiments of the disclosed system.

Referring to FIG. 8, at block 810, the broker 320 queries a data provider 806 for a user profile comprising of requested affiliation attributes over a mutually secured connection (SSL or TLS) using a client certificate 610 of the broker server 1116 and a server certificate 808 of the server hosting the data provider 806. At block 812, the received profile is processed by the broker to tokenize the user affiliations 814. At block 816, the affiliation score 818 for the user 220 is updated.

Figure 9:
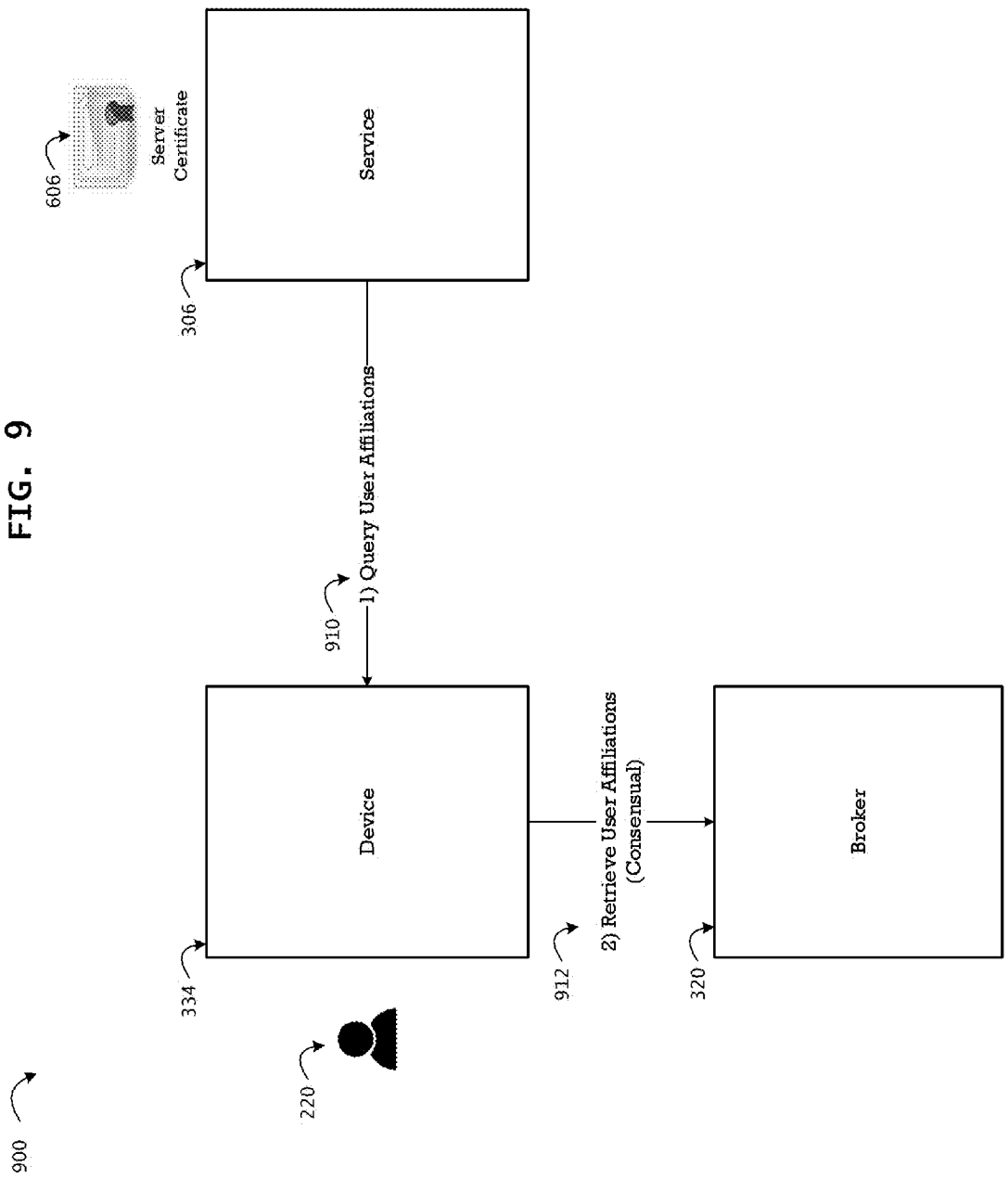
FIG. 9 is a schematic diagram illustrating interactions and control flows between the user device, the broker and the service provider of the model, to query and retrieve affiliations, in accordance with various exemplary embodiments of the disclosed system.

Referring to FIG. 9, at block 910, a service 306 accessed by the user 220 from device 334 queries affiliations of the user 220 for personalization over a secured connection (SSL or TLS) using the server certificate 606 of the server 1110 hosting the service 306. At block 912, the client application 336 on the device 334 prompts the user 220 for consent and retrieves the requested user affiliations from the broker 320. The received user affiliations, contained in a user token generated by the broker 320, are forwarded to the service 306.

Figure 10:
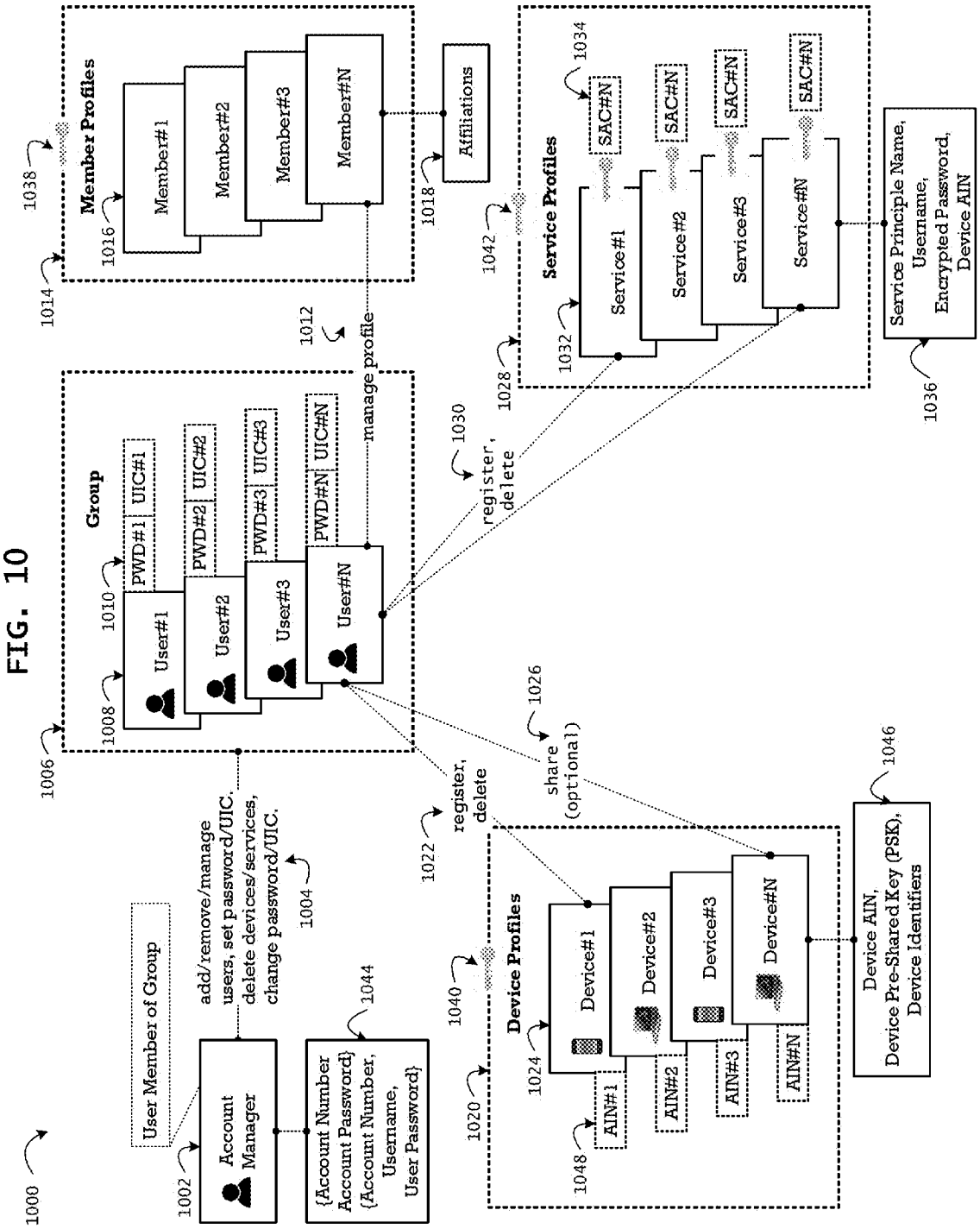
FIG. 10 is a schematic diagram illustrating the configuration and data representation for device, member (i.e. user), and service profiles, group management and user accounts of the service subscription, in accordance with various exemplary embodiments of the disclosed system.

Referring to FIG. 10 and FIG. 11, at block 1004, the group account manager or registered user 1002 associated with the service subscription account connects to the broker dashboard 1126 (self-service portal) using the account number and account password, or the account number, username, and user password 1044. The group account manager 1002 may add, remove, or manage users and create a password for the user members of the group (to access the self service management portal at the broker dashboard 1126). The registered user 1002 may delete devices 1022 or services 1030 or change the user password 1012. At block 1006, a group is illustrated with one or more users 1008, wherein, at 1010, each user is assigned a management password (PWD) and UIC.

At block 1012, each user may connect to the broker dashboard using the account number and user password to change the password or manage the member profile 1016.

At block 1014, member profiles 1016 are illustrated, the member profiles 1016 comprising user attributes that may include a plurality of affiliations 1018 and a plurality of attributes about the user harvested from a plurality of data providers 806.

At block 1020, device profiles 1024 registered (1022) and optionally shared (1026) by the user 220 from the respective device 334 are stored in the broker repository 332.

At block 1046, the registered device profile 1024 comprises of at least the device identifiers, device AIN, and the device pre-shared key (PSK).

At block 1028, service profiles 1032 registered (1030) by the user 220 from a device 334 and stored in the broker repository 332 are illustrated. At block 1036, the passwords in the service profiles 1032 are encrypted at the device 334 using the device watermark and the user's SAC 1034 that is only known to the user 220.

In one exemplary embodiment of the disclosed system, the member profiles 1014, device profiles 1020, and service profiles 1028 are further encrypted by the broker 320 using the hardware key (1038, 1040, and 1042, respectively) of the broker server 1116.

In another exemplary embodiment of the disclosed system, the group account manager and registered users 1002 may login through a self-service management portal at the broker dashboard 1126 to view, edit, or delete member, device, and service profiles, set or change the password or UIC, generate activity reports, and configure notifications based on role based administration controls.

Referring to FIG. 11, the disclosed system comprises of the user 220, the device 334, the service 306, the broker 320 and the data providers 806.

All communications between the device agent 1106, the service agent 1114, the broker agent 1120, and between the broker service 1118 and the data providers 806 are performed over secure and encrypted transport protocols (e.g. Transmission Control Protocol (TCP), User Datagram Protocol (UDP), Message Bus, Intents, Push Notifications, etc.) and APIs (e.g. Representational State Transfer (REST), Simple Object Access Protocol (SOAP), Lightweight Directory Access Protocol (LDAP), etc.). The data exchanges occur in structured and semi-structured data formats (e.g. Comma Separated Values (CSV), Tab Separated Values (TSV), Excel, JavaScript Object Notation or JSON, Extensible Markup Language or XML, etc.).

The device 334 further comprises of the device agent 1106 and the client application 336. The device agent 1106 registers (or deregisters) the device 334 with the broker agent 1120 as initiated by the user 220 through user controls 204. The client application interfaces locally with the device agent 1106 on the device 334. At block 1136, the client application 336 communicates, using REST APIs for messaging, with the broker agent 1120. At block 1108, the client application 336 communicates with the service 306 accessed by the user 220.

The server 1110 may be any type of server such as for example a web server, an application server, a database server, a proxy server, a gateway server, or a network device.

The service 306, hosted on the server 1110, includes a service agent 1114 plugin. At block 1134, the service agent communicates with the broker agent 1120 for service registration and token verification.

The broker 320, hosted on the broker server 1116, further comprises the broker service 1118 and the broker agent 1120. At block 1140, the broker service connects to a plurality of data providers 806 to query and retrieve user profiles comprising of user attributes and/or affiliations.

The broker agent 1120 interfaces with the broker service 1118, the broker repository 332, the broker dashboard 1126, the client application 336, and the service agent 306. At block 1138, the broker agent initiates a query to retrieve a user profile from the data providers 806. At block 1132, operations to read (get) or write (set) member, device, and service profiles are performed. At block 1142, the broker agent 1120 responds to directed queries by the broker dashboard 1126 for administration, management and configuration of groups and profiles (i.e. member, device, and service).

The broker dashboard 1126, hosted on a management server 1124, provides the console for administration of the disclosed system, group account management, and member self-service portals.

The service provider 1144 represents the entity (e.g. organization, service vendor) providing the service 306 hosted on the server 1110.

Figure 12A:
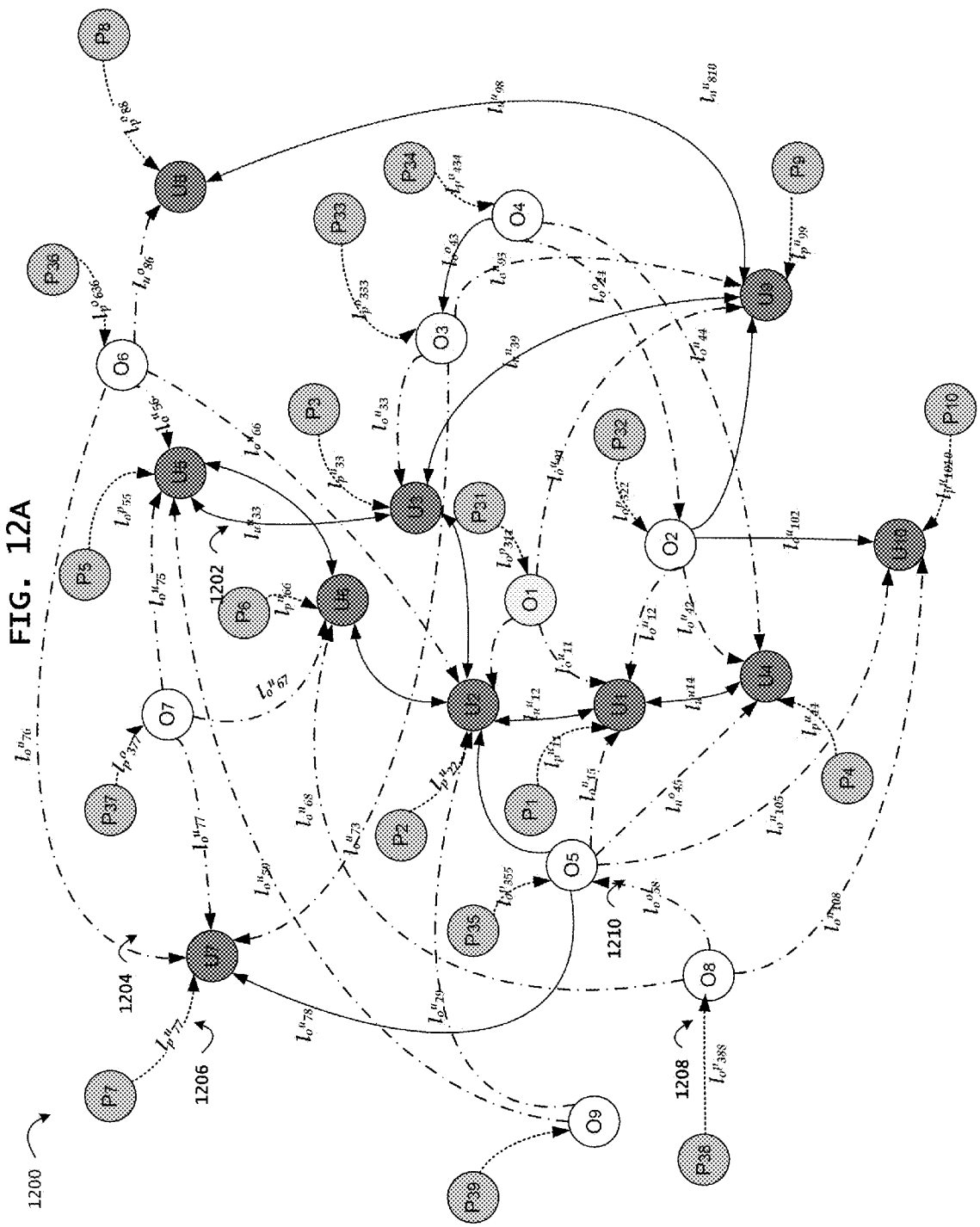
FIG. 12A is a schematic diagram illustrating a directed graph comprised of entities represented as nodes (or vertices) and relationships (or links) associated with attributes represented as connectors, in accordance with various exemplary embodiments of the disclosed system.

Referring to FIG. 12A, user nodes $U_n$, organization nodes $O_n$, and profile nodes $P_n$ are illustrated. Links to annotate attributes between user nodes 1202, between a user node and an organization node 1204, between a user node and a profile node 1206, and an organization node and a profile node 1208, and between organization nodes 1210 are illustrated.

Figure 12B:
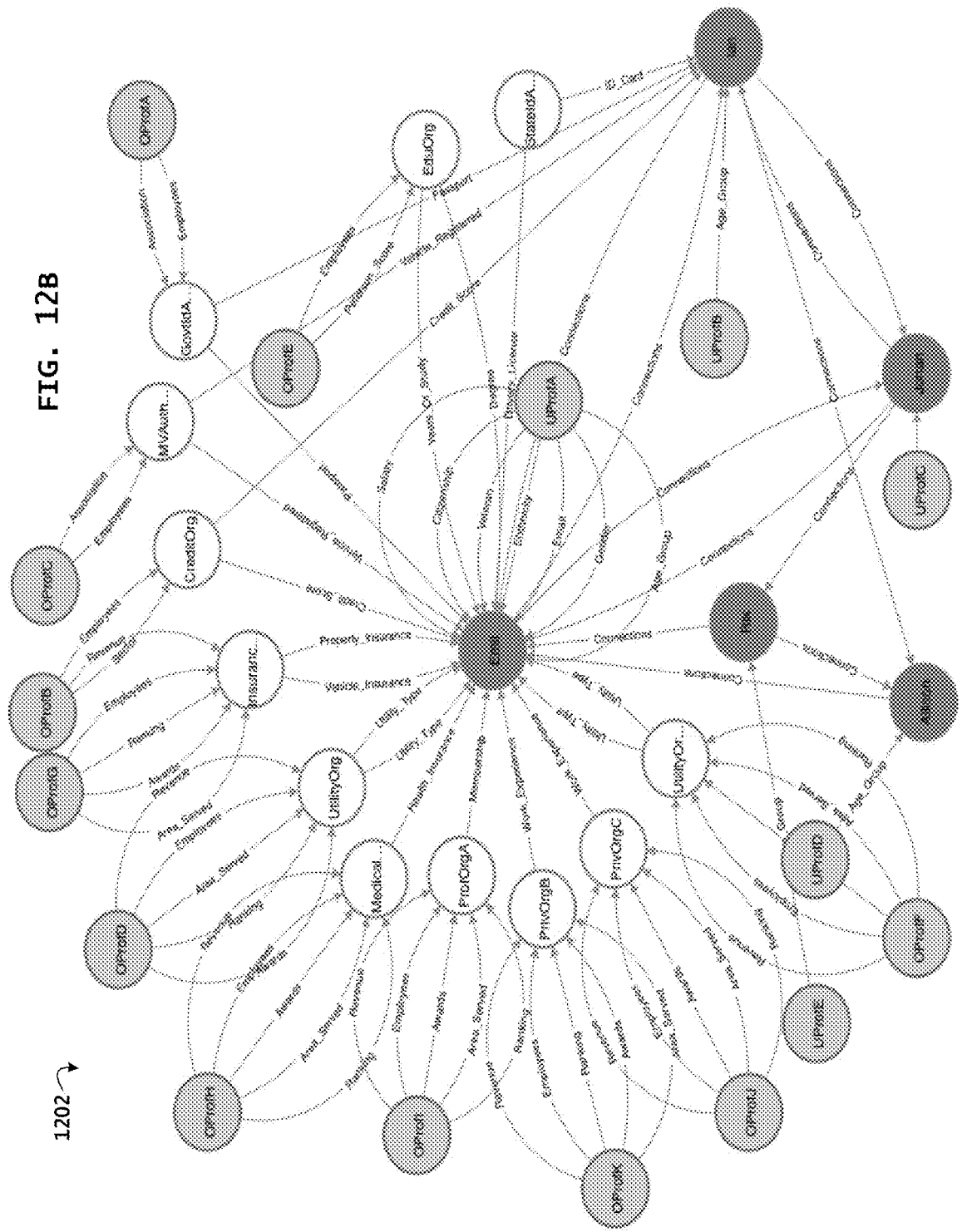
FIG. 12B is a schematic diagram illustrating a directed subset graph for a user comprised of entities represented as nodes (or vertices) and relationships (or links) associated with attributes represented as connectors, in accordance with various exemplary embodiments of the disclosed system.
Figure 12C:
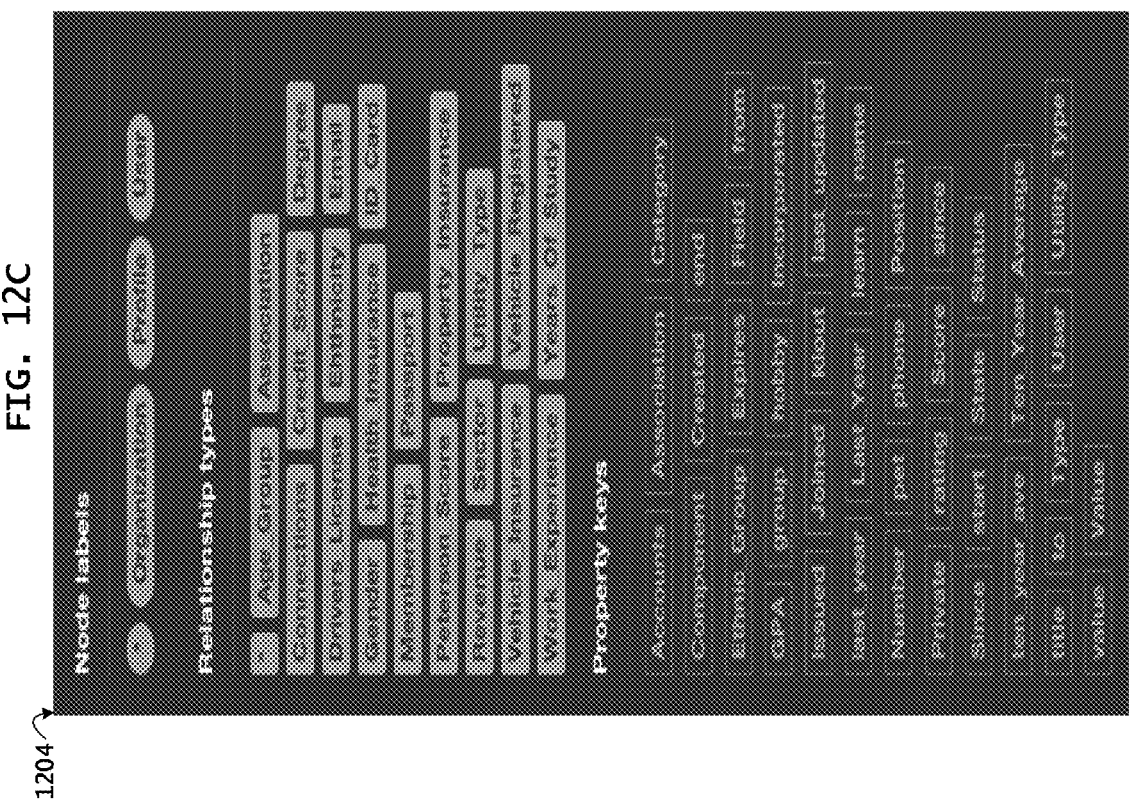
FIG. 12C is an illustration of user, organization and profile nodes, affiliation relationships, and property keys to build and traverse a directed graph, in accordance with various exemplary embodiments of the disclosed system.

Referring to FIG. 12B, at block 1202 a directed subset graph for a user is illustrated based on a query:
$MATCH (u:User),(u)<-[*]-(n) where u.name="Emil" RETURN u,n;

Referring to FIG. 12C, block 1204 illustrates user, organization and profile nodes, affiliation relationships, and property keys to build and traverse a directed graph.

Figure 12D:
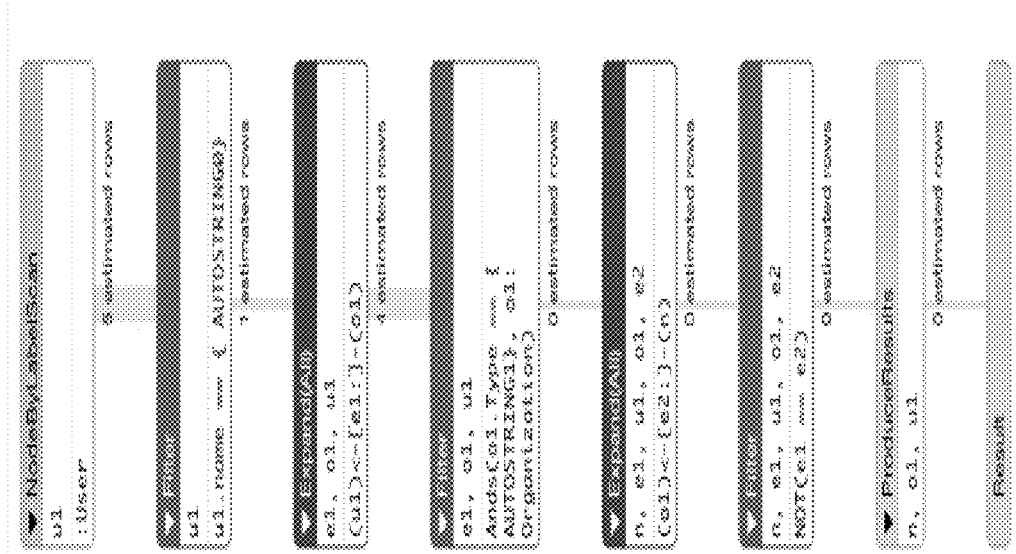
FIG. 12D is an internal representation of a subset graph based on a query, in accordance with various exemplary embodiments of the disclosed system.

Referring to FIG. 12D, block 1206 is an internal representation of a subset graph based on a query.

Figure 13A:
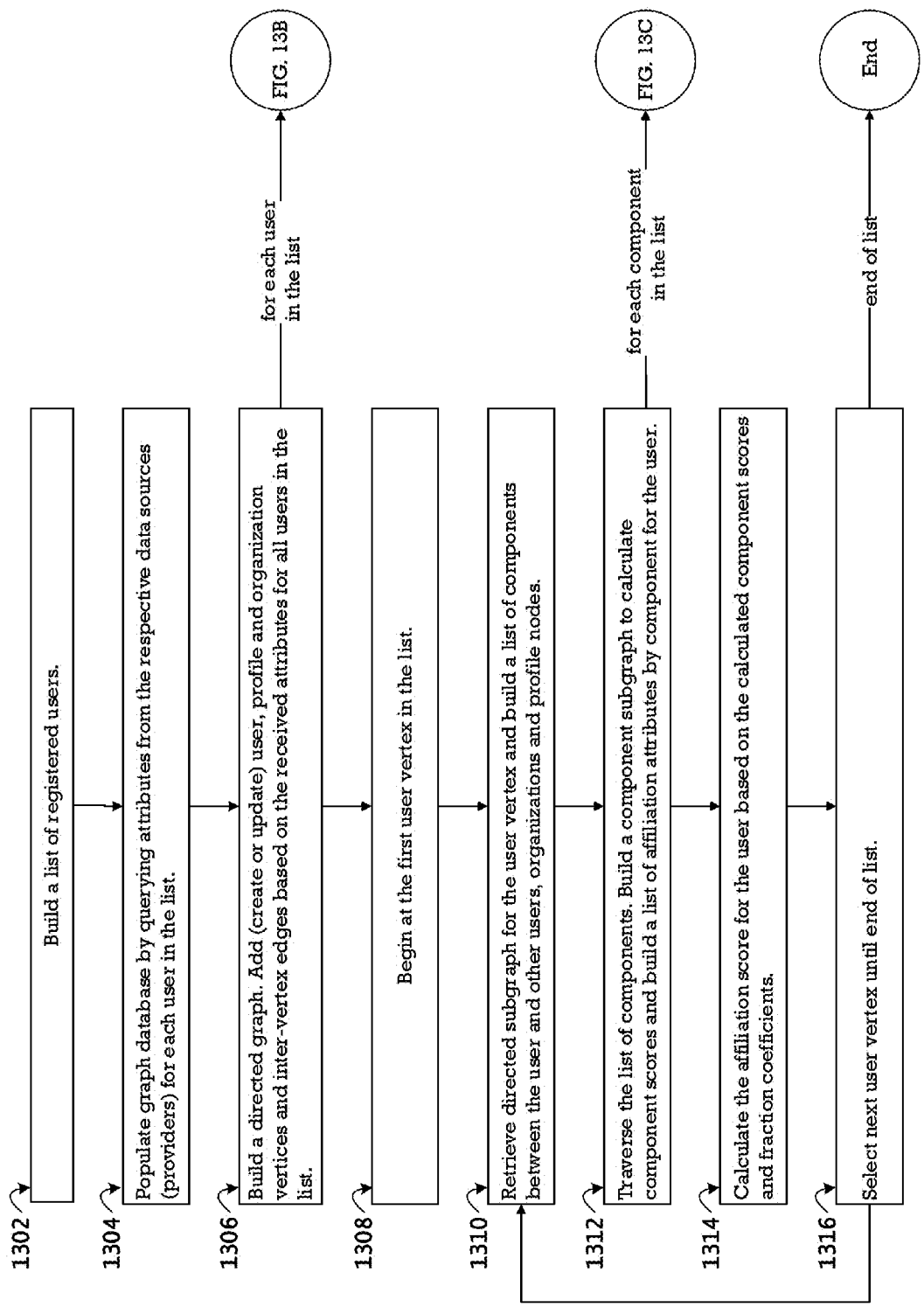
Figure 13C:
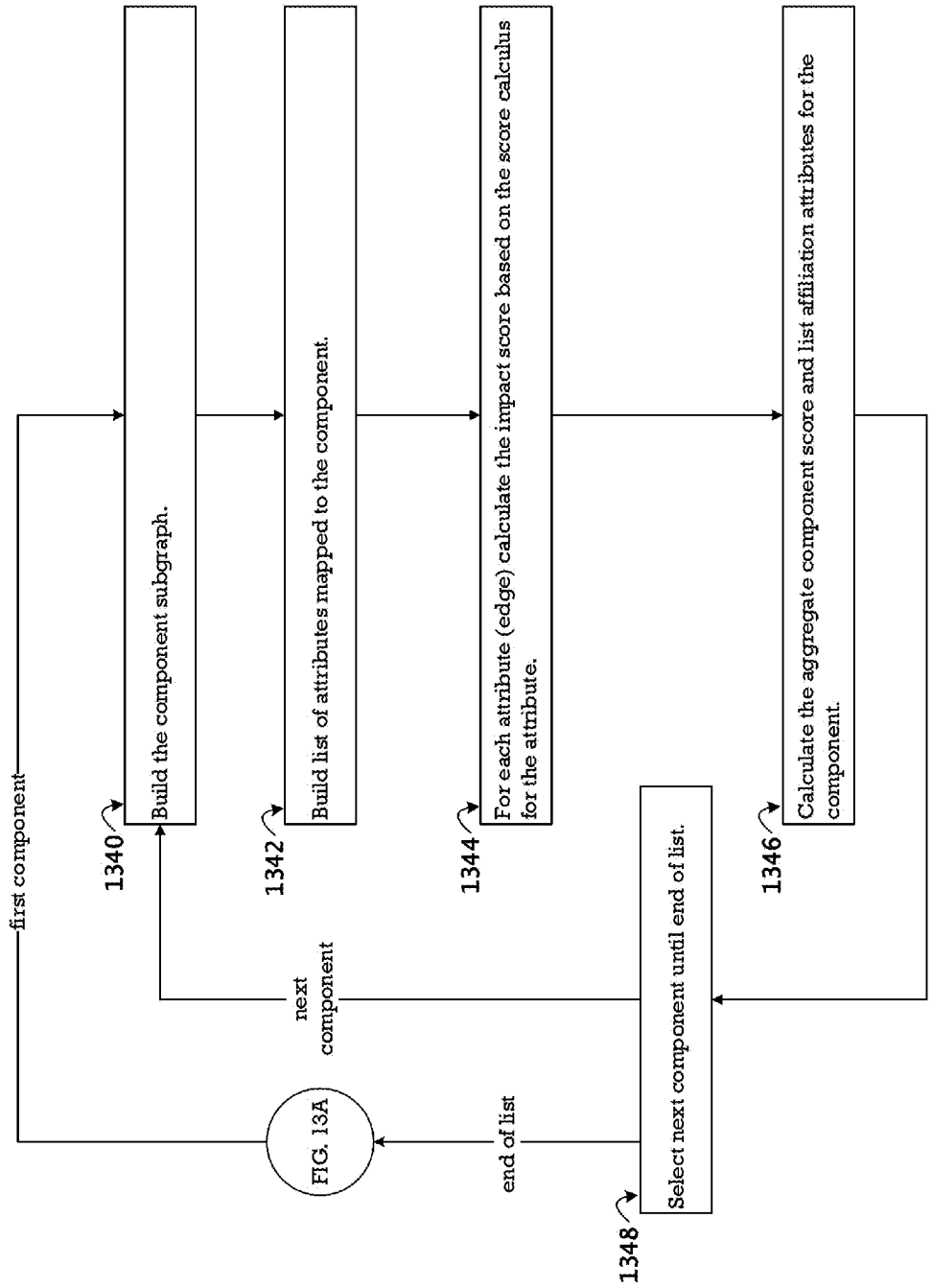

Referring to FIG. 13A, at block 1302, a list of registered users is built. At block 1304, the graph database is populated by querying attributes from the respective data sources (providers) for each user in the list. At block 1306, a directed graph is built by adding (creating or updating) user, profile, and organization vertices and inter-vertex edges based on the received attributes for all users in the list. For each user in the list, the flowchart illustrated in FIG. 13B is executed, as discussed below. At block 1308, iteration at the first user vertex in the list is begun. At block 1310, the directed subgraph for the user vertex is retrieved and a list of components between the user and other users, organizations, and profile nodes is built. At block 1312, the list of components is traversed for the user by building a component subgraph to calculate component scores and build a list of affiliation attributes by component for the user. For each component in the list, the flowchart in FIG. 13C is executed, as discussed below. At block 1314, the affiliation score is calculated for the user based on the calculated component scores and fraction coefficients. At block 1316, the next user vertex is selected to repeat execution from block 1310 until the end of the list of user vertices.

Referring to FIG. 13B, at block 1318, the user vertex is added (created or updated). At block 1320, a list of attributes is built based on the received attributes for the user, starting at the first attribute in the list. At block 1322, a profile vertex for the user is added (created or updated). At block 1324, edge and attributes between user and profile vertices are added (created or updated). At block 1326, an organization vertex is added (created or updated). At block 1328, a profile vertex for the organization is added (created or updated). At block 1330, edge and attributes between organization and profile vertices are added (created or updated). At block 1332, edge and attributes between user and organization vertices are added (created or updated). At block 1334, edge and attributes between user and user vertices are added (created or updated). At block 1336, edge and attributes between organization and organization vertices are added (created or updated). At block 1338, the next attribute is selected to repeat execution from block 1322 until the end of the list of attributes.

Referring to FIG. 13C, for the first component, at block 1340, the component subgraph is built. At block 1342, a list of attributes mapped to the component is built. At block 1344, for each attribute (edge), the impact score is calculated based on the score calculus for the attribute. At block 1346, the aggregate component score and list of affiliation attributes are calculated for the component. At block 1348, the next component is selected to repeat execution from block 1340 until the end of the list of components.

Directed Graph Queries

Figure 13D:
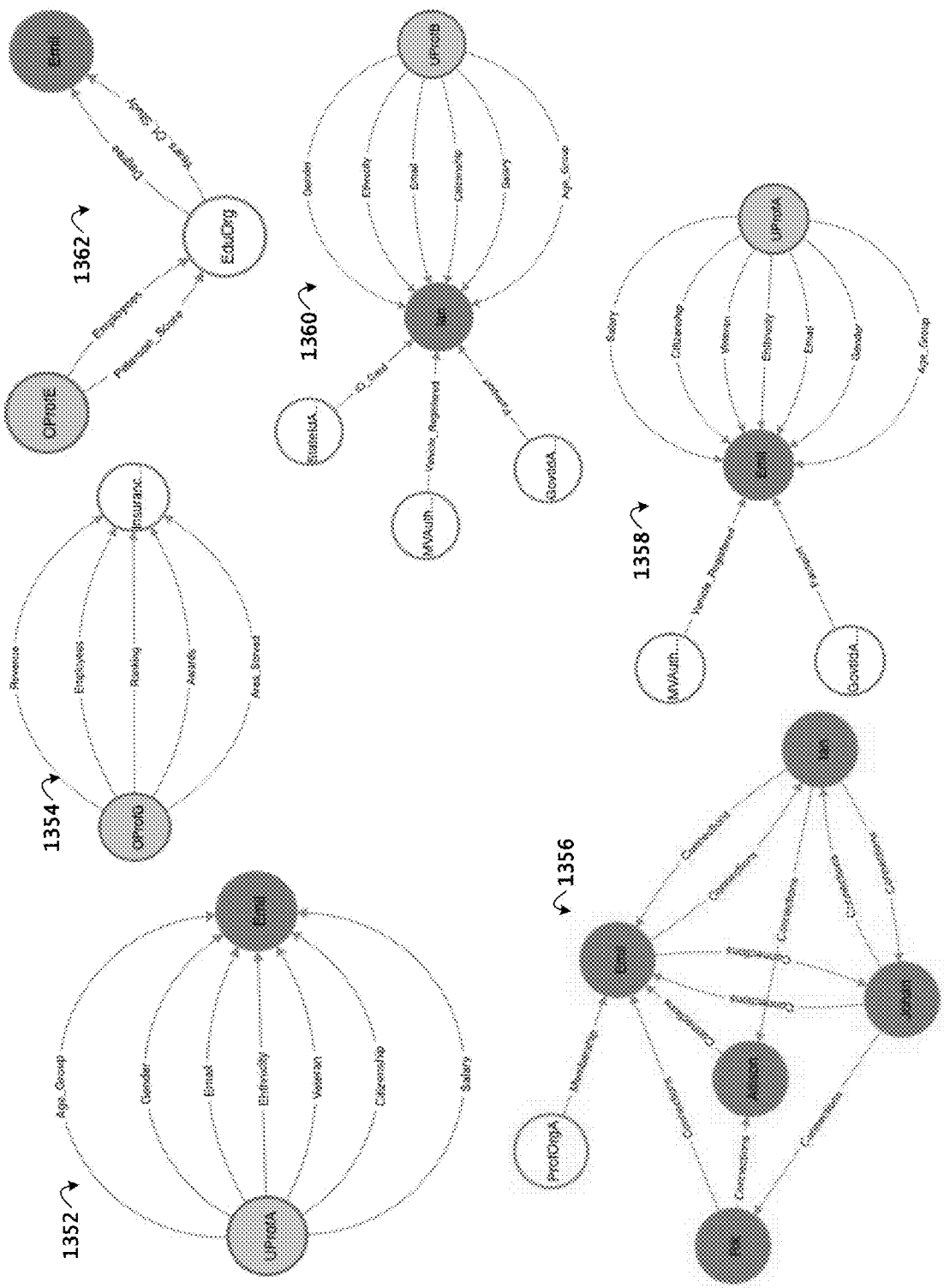
FIG. 13D is an illustration of queries executed on the directed graph database to build subgraphs (subset graphs) based on a match criteria, to traverse the directed graph, in accordance with various exemplary embodiments of the disclosed system.

Referring to FIG. 13D, queries on a directed graph database are illustrated to build subgraphs (subset graphs) based on a match criteria.

At block 1352, a subgraph of a user and a profile node, and a corresponding edge, is illustrated based on a query:
$Match (u:User),(p:Profile) where u.name="Emil" and p.name="UProfA" return u,p;

At block 1354, a subgraph of an organization and a profile node, and a corresponding edge, is illustrated based on a query:
$Match (o:Organization),(p:Profile) where o.name="InsuranceOrganization" and p.name="OProfG" return o,p;

Component Subgraph Queries

At block 1356, a user (Emil's) component (Reference) attributes are illustrated based on a query:
$MATCH (u1:User),(u1)<-[e]-(n) where u1.name="Emil" and e.Component="Reference" RETURN u1,n;

At block 1358, a user (Emil's) component (Civic) attributes are illustrated based on a query:
$MATCH (u1:User),(u1)<-[e]-(n) where u1.name="Emil" and e.Component="Civic" RETURN u1,n;

At block 1360, a user (Ian's) component (Civic) attributes are illustrated based on a query:
$MATCH (u1:User),(u1)<-[e]-(n) where u1.name="Ian" and e.Component="Civic" RETURN u1,n;

At block 1362, a second level query for a user (Emil's) component (Education) is illustrated:
MATCH (u1:User),(o1:Organization),(u1)<-[e1]-(o1)<-[e2]-(n) where u1.name="Emil" and e1.Component="Education" RETURN u1,o1,n;

FIG. 14 illustrates an exemplary method of providing authoritative identity recognition of a user at a device to an accessed service for authentication including a client application, a device agent, a service agent, a broker agent, a broker service, a user service authentication code (SAC), a device AIN, an account number, a pre-authentication token, and a one-time user token.

At step 1402 of the method, the user registers with the broker agent to create a password and a user identification code (UIC) for the user, linked to the account number associated with a group of users.

At step 1404, the method can include registering, by the user at a device with the broker agent, the device to create a device profile comprising of at least the received unique device identifiers required to generate a device watermark, a device pre-shared key (PSK), and a device AIN. The device PSK and device AIN are generated for the device by the broker agent and transmitted to the device agent over a secure channel during device registration.

At step 1406, the method can include registering, by the user, a plurality of services with the broker agent using service profiles, wherein a service profile comprises of a service principal name (SPN), a username associated with the SPN, a password, and a device AIN, and where the password is encrypted at the device using the device watermark and the user's SAC.

At step 1408, the method can include storing, by the broker agent, the registered user, device, and service profiles in a broker repository.

At step 1410, the method can include accessing, by the user at the device, a service, wherein the device agent is executing on the device and the service agent is executing on the accessed service.

At step 1412, the method can include clicking, by the user, on a service icon displayed by the client application on the user's device via the service agent of the accessed service to provide consent for identity recognition.

At step 1414, the method can include prompting, by the client application, to receive the user's SAC from the user.

At step 1416, the method can include generating, by the device agent for the client application, a user token request containing the device AIN, the account number, a timestamp, a digital signature generated using the device watermark and the timestamp, the service principal name (SPN), the username associated with the SPN, and optionally a received digitally signed service identifier via the service agent.

At step 1418, the method can include sending the generated user token request by the device agent to the broker agent.

At step 1420, the method can include processing the received user token request by the broker agent to generate a one-time user token linked to the accessed service, the one-time user token comprising the encrypted password or a pre-authentication token issued for the user by the accessed service to the broker agent using the username and a secret key.

At step 1422, the method can include sending the generated one-time user token by the broker agent to the device agent.

At step 1424, the method can include decrypting, by the device agent at the device, the encrypted password in the received one-time user token using the device watermark and the user's SAC.

At step 1426, the method can include forwarding, by the device agent, the decrypted password or the pre-authentication token with the one-time user token, via the client application, to the service agent of the accessed service.

At step 1428, the method can include verifying, by the service agent of the accessed service with the broker agent, the received one-time user token from the client application.

At step 1430, the method can include authenticating, by the accessed service, the user based on the received password or pre-authentication token included with the verified one-time user token.

At step 1432, the method can include notifying the user, by the broker agent, of successful and failed authentication attempts to access the service from the device.

FIG. 15 illustrates an exemplary method of providing an affiliation score along with component scores and affiliation attributes for a user at a device to an accessed service with or without requiring authentication including a client application, a device agent, a service agent, a broker agent, a broker service, a user personal identification code (PIC), a device AIN, an account number, a pre-authentication token, a one-time user token, and a plurality of data providers.

At step 1502 of the method, the user registers with the broker agent to create a password and a user identification code (UIC) for the user, linked to the account number associated with a group of users.

At step 1504, the method can include registering, by the user at a device with the broker agent, the device to create a device profile comprising of at least the received unique device identifiers required to generate a device watermark, a device pre-shared key (PSK), and a device AIN. The device PSK and device AIN are generated for the device by the broker agent and transmitted to the device agent over a secure channel during device registration.

At step 1506, the method can include registering, by the user, a plurality of services with the broker agent using service profiles, wherein a service profile comprises of a service principal name (SPN), a username associated with the SPN, a password, and a device AIN, and where the password is encrypted at the device using the device watermark and the user's SAC.

At step 1508, the method can include storing, by the broker agent, the registered user, device, and service profiles in a broker repository.

At step 1510, the method can include accessing, by the user at the device, a service, wherein the device agent is executing on the device and the service agent is executing on the accessed service.

At step 1512, the method can include clicking, by the user, on a service icon displayed by the client application on the user's device via the service agent of the accessed service to provide consent for identity affiliation.

At step 1514, the method can include prompting, by the client application, to receive the user's SAC or the user's UIC from the user.

At step 1516, the method can include generating, by the device agent for the client application, a user token request containing at least the device AIN, the account number, a timestamp, a digital signature generated using the device watermark and the timestamp, the service principal name, the username associated with the SPN where the accessed service requires authentication or the user's UIC encrypted using the device pre-shared key where the accessed service requires no authentication, and a received digitally signed service identifier via the service agent.

At step 1518, the method can include sending the generated user token request by the device agent to the broker agent.

At step 1520, the method can include processing the received user token request by the broker agent to generate a one-time user token linked to the accessed service, the one-time user token comprising the affiliation score, component scores, affiliation attributes, and optionally the encrypted password or a pre-authentication token issued for the user by the accessed service to the broker agent using the username and a secret key.

At step 1522, the method can include sending the generated one-time user token by the broker agent to the device agent.

At step 1524, the method can include decrypting, by the device agent at the device, the encrypted password in the received one-time user token using the device watermark and the user's SAC.

At step 1526, the method can include forwarding, by the device agent, the decrypted password or the pre-authentication token with the one-time user token, via the client application, to the service agent of the accessed service.

At step 1528, the method can include verifying, by the service agent of the accessed service with the broker agent, the received one-time user token from the client application.

At step 1530, the method can include authenticating, by the accessed service, the user based on the received password or pre-authentication token included with the verified one-time user token.

At step 1532, the method can include notifying the user, by the broker agent, of successful and failed authentication attempts to access the service from the device.

At step 1534, the method can include personalization of content and services, by the accessed service, based on the received affiliation score, component scores, and affiliation attributes included with the verified one-time user token.

In one exemplary embodiment of the disclosed system, the service agent of the service provider may comprise a client-side script, rendered, for example, via a Java Server Page (JSP) or Active Server Page (ASP), to execute locally on the user's device, for example, as a web browser code object in a runtime environment (container).

In another exemplary embodiment of the disclosed system, the service agent of the service provider may comprise a server-side code object (servlet or class) and a pre- or post-processor filter that executes on the server.

In one exemplary embodiment of the disclosed system, the device agent may comprise an operating system (OS) platform specific service, application, and/or taskbar (dashboard) control.

In one exemplary embodiment of the disclosed system, the broker agent may be implemented as a web service or application.

Figure 16:
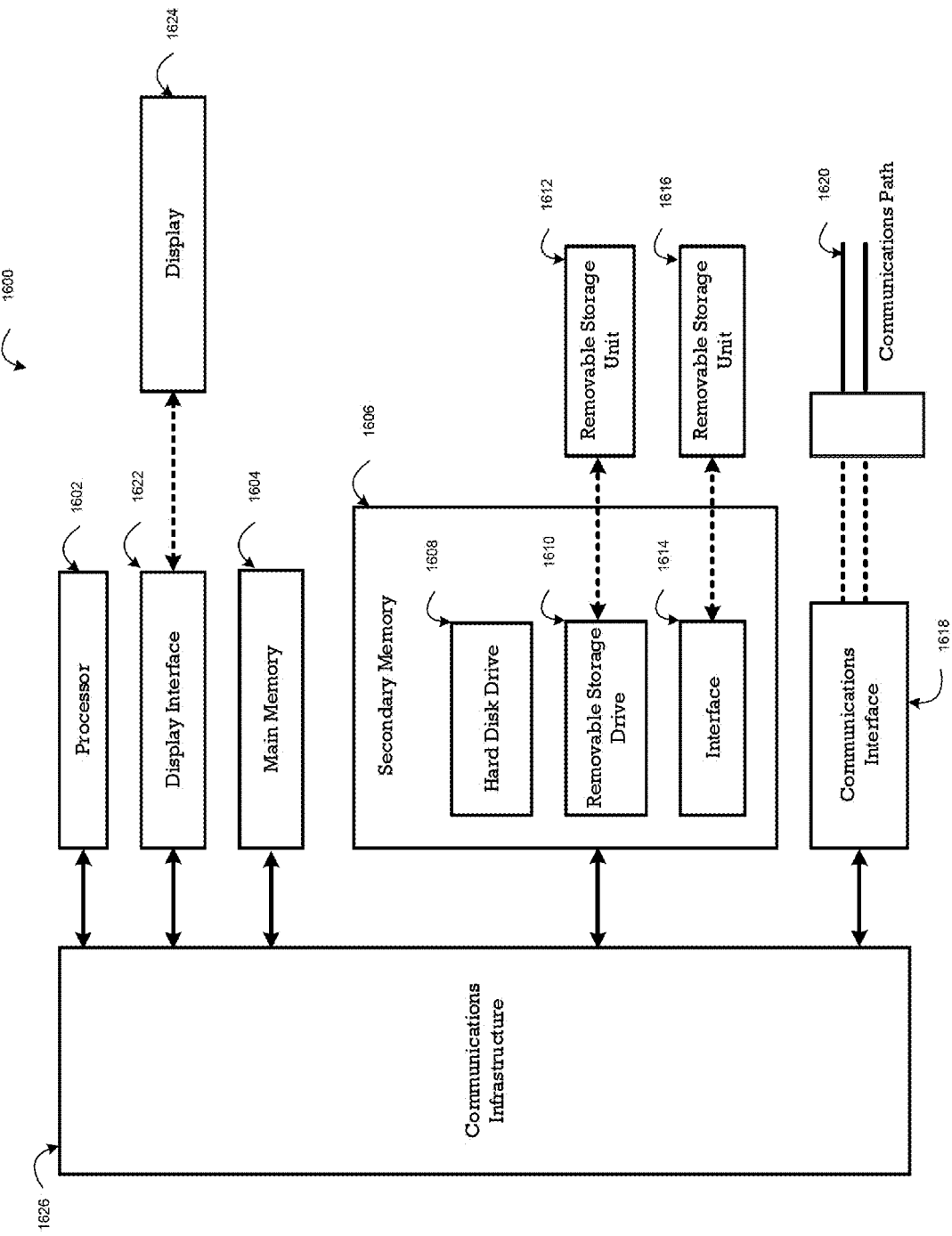
FIG. 16 is a diagram of an exemplary computer system in which embodiments of the method of determining trustworthiness of signaling and data exchange between network systems can be implemented.

Although exemplary embodiments have been described in terms of a computing device or instrumented platform, it is contemplated that it may be implemented in software on microprocessors/general purpose computers, such as the computer system 1600 illustrated in FIG. 16. In various embodiments, one or more of the functions of the various components may be implemented in software that controls a computing device, such as computer system 1600, which is described below with reference to FIG. 16.

Aspects of the present invention shown in FIGS. 1-15, or any part(s) or function(s) thereof, may be implemented using hardware, software modules, firmware, non-transitory computer readable media having instructions stored thereon, or a combination thereof, and may be implemented in one or more computer systems or other processing systems.

FIG. 16 illustrates an example computer system 1600 in which embodiments of the present invention, or portions thereof, may be implemented as computer-readable code. For example, the network systems and architectures disclosed here can be implemented in computer system 1600 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores".

Various embodiments of the invention are described in terms of this example computer system 1600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 1602 may be a special purpose or a general-purpose processor device. As will be appreciated by persons skilled in the relevant art, processor device 1602 may also be a single processor in a multi-core/multiprocessor system, such system operating alone, or in a cluster of computing devices operating in a cluster or server farm. Processor device 1602 is connected to a communication infrastructure 1626, for example, a bus, message queue, network, or multi-core message-passing scheme.

The computer system 1600 also includes a main memory 1604, for example, random access memory (RAM), and may also include a secondary memory 1606. Secondary memory 1606 may include, for example, a hard disk drive 1608, removable storage drive 1610. Removable storage drive 1610 may comprise a floppy disk drive, a magnetic tape drive, an optical disk drive, a flash memory, or the like.

The removable storage drive 1610 reads from and/or writes to a removable storage unit 1612 in a well-known manner. Removable storage unit 1612 may comprise a floppy disk, magnetic tape, optical disk, etc. which is read by and written to by removable storage drive 1610. As will be appreciated by persons skilled in the relevant art, removable storage unit 1612 includes a non-transitory computer usable storage medium having stored therein computer software and/or data.

In alternative implementations, secondary memory 1606 may include other similar means for allowing computer programs or other instructions to be loaded into computer system 1600. Such means may include, for example, a removable storage unit 1616 and an interface 1614. Examples of such means may include a program cartridge and cartridge interface (such as that found in video game devices), a removable memory chip (such as an EPROM, or PROM) and associated socket, and other removable storage units 1616 and interfaces 1614 which allow software and data to be transferred from the removable storage unit 1612 to computer system 1600.

The computer system 1600 may also include a communications interface 1618. Communications interface 1618 allows software and data to be transferred between computer system 1600 and external devices. Communications interface 1618 may include a modem, a network interface (such as an Ethernet card), a communications port, a PCMCIA slot and card, or the like. Software and data transferred via communications interface 1618 may be in the form of signals, which may be electronic, electromagnetic, optical, or other signals capable of being received by communications interface 1618. These signals may be provided to communications interface 1618 via a communications path 1620. Communications path 1620 carries signals and may be implemented using wire or cable, fiber optics, a phone line, a cellular phone link, an RF link or other communications channels.

The computer system 1600 may also include a computer display 1624 and a display interface 1622. According to embodiments, the display used to display the GUIs and dashboards shown in FIGS. 2, 4A-B, and 5 described above may be the computer display 1624, and the console interface may be display interface 1622.

In this document, the terms "computer program medium," "non-transitory computer readable medium," and "computer usable medium" are used to generally refer to media such as removable storage unit 1612, removable storage unit 1616, and a hard disk installed in hard disk drive 1608. Signals carried over communications path 1620 can also embody the logic described herein. Computer program medium and computer usable medium can also refer to memories, such as main memory 1604 and secondary memory 1606, which can be memory semiconductors (e.g., DRAMs, etc.). These computer program products are means for providing software to computer system 1600.

Computer programs (also called computer control logic) are stored in main memory 1604 and/or secondary memory 1606. Computer programs may also be received via communications interface 1618. Such computer programs, when executed, enable computer system 1600 to implement the present invention as discussed herein. In particular, the computer programs, when executed, enable processor device 1602 to implement the processes of the present invention, such as the stages in the methods illustrated by the flowcharts in FIGS. 3A-C, 6-9, and 11-14, discussed above. Accordingly, such computer programs represent controllers of the computer system 1600. Where the invention is implemented using software, the software may be stored in a computer program product and loaded into computer system 1600 using removable storage drive 1610, interface 1614, and hard disk drive 1608, or communications interface 1618.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

In certain exemplary embodiments of the disclosed system, a group account number may be assigned to a business unit of an enterprise for role based controls for members of the group.

In an alternate embodiment of the disclosed system, the service sign-in ceremony may be accomplished without requiring a service agent (by the service provider), through a plugin loaded by the client application (e.g. web browser) wherein the accessed service is qualified based on a server certificate and the encrypted password retrieved from the user token is used by the client application plugin to complete the authentication ceremony. Accordingly, the digitally signed service identifier in the user token request is optional.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

What is claimed is:

1. A method of providing authoritative identity recognition of a user at a device to an accessed service for authentication including a client application, a device agent, a service agent, a broker agent, a broker service, a user service authentication code (SAC), a device asset identification number (AIN), an account number, a pre-authentication token, and a one-time user token, the method comprising:

registering, of the user with the broker agent, to create a password and a user identification code (UIC) for the user, linked to the account number associated with a group of users;

registering, by the user at the device with the broker agent, the device to create a device profile comprising of at least the received unique device identifiers required to generate a device watermark and a device pre-shared key, and to create a device AIN for the device;

registering, by the user, a plurality of services with the broker agent using service profiles, wherein a service profile comprises of a service principal name (SPN), a username associated with the SPN, a password, and a device AIN, and further wherein the password is encrypted at the device using the device watermark and the user SAC;

storing, by the broker agent, in a broker repository, the registered user, device, and service profiles;

accessing, by the user at the device, a service, wherein the device agent is executing on the device and the service agent is executing on the accessed service;

clicking, by the user, on a service icon displayed by the client application on the device via the service agent of the accessed service to provide consent for identity recognition;

prompting, by the client application, to receive the user SAC from the user;

generating, by the device agent for the client application, a user token request containing the device AIN, the account number, a timestamp, a digital signature generated using the device watermark and the timestamp, the service principal name, the username associated with the SPN, and optionally a received digitally signed service identifier via the service agent;

sending the generated user token request by the device agent to the broker agent;

processing the received user token request by the broker agent to generate a one-time user token linked to the accessed service, comprising of the encrypted password or a pre-authentication token issued for the user by the accessed service to the broker agent using the username and a secret key;

sending the generated one-time user token by the broker agent to the device agent;

decrypting, by the device agent at the device, the encrypted password in the received one-time user token using the device watermark and the user SAC;

forwarding, by the device agent, the decrypted password or the pre-authentication token with the one-time user token, via the client application, to the service agent of the accessed service;

verifying, by the service agent of the accessed service with the broker agent, the one-time user token received from the client application;

authenticating, by the accessed service, the user based on the received password or pre-authentication token included with the verified one-time user token; and notifying the user, by the broker agent, of successful and failed authentication attempts to access the service from the device.

2. The method of claim 1, wherein the device watermark is dynamically generated in memory by a hash function using the device pre-shared key, shared by the broker agent with the device agent over a secure channel, and device identifiers associated with the registered device, autonomously at the device by the device agent, and at the broker agent using the device AIN, and further wherein the device watermark is not stored on the user's device or on the broker server in memory or on storage media or transmitted on the network.

3. The method of claim 1, wherein the verification includes sending the received one-time user token to the broker agent for validation of the one-time user token and verification of the service based on the server certificate and the service principal name linked to the accessed service.

4. The method of claim 1, wherein the globally unique device profile of the device registered for the account number comprises device non-repudiable volatile and non-volatile software, system, and hardware level attributes that include at least one of: hardware identification, processor identification, manufacturer identification, integrated resource identification, Bluetooth device identification, hardware configuration, service tags, product registrations, wireless service identifiers, geo-location indicators, and device AIN.

5. The method of claim 1, wherein the notification is sent as an email, text, or voice message and includes at least an episode date, time, geo-location, device identifier, and service principal name.

6. The method of claim 1, wherein a plugin loaded at the device by the client application generates the user token request without requiring the service agent.

7. A method of providing an affiliation score along with component scores and affiliation attributes for a user at a device to an accessed service with or without requiring authentication including a client application, a device agent, a service agent, a broker agent, a broker service, a user personal identification code (PIC), a device asset identification number (AIN), an account number, a pre-authentication token, a one-time user token, and a plurality of data providers, the method comprising:

registering, of the user with the broker agent, to create a password and a user identification code (UIC) for the user, linked to the account number associated with a group of users;

registering, by the user at the device with the broker agent, the device to create a device profile comprising of at least the received unique device identifiers required to generate a device watermark, a device pre-shared key, and to create a device AIN for the device;

registering, by the user, a plurality of services with the broker agent, using service profiles, wherein a service profile comprises of a service principal name (SPN), a username associated with the SPN, a password, and a device AIN, and further wherein the password is encrypted at the device using the device watermark and the user SAC;

storing, by the broker agent, in a broker repository, the registered user, device, and service profiles;

accessing, by the user at the device a service, wherein the device agent is executing on the device and the service agent is executing on the accessed service;

clicking, by the user, on a service icon displayed by the client application on the device via the service agent of the accessed service to provide consent for identity affiliation;

prompting, by the client application, to receive the user SAC or the user's UIC from the user;

generating, by the device agent for the client application, a user token request containing at least the device AIN, the account number, a timestamp, a digital signature generated using the device watermark and the timestamp, the service principal name (SPN), the username associated with the SPN where the accessed service requires authentication or the user's UIC encrypted using the device pre-shared key where the accessed service requires no authentication, and a received digitally signed service identifier via the service agent;

sending the generated user token request by the device agent to the broker agent;

processing the received user token request by the broker agent to generate a one-time user token linked to the accessed service comprising the affiliation score, component scores, affiliation attributes, and optionally the encrypted password or a pre-authentication token issued for the user by the accessed service to the broker agent using the username and a secret key;

sending the generated one-time user token by the broker agent to the device agent;

decrypting, by the device agent at the device, the encrypted password in the received one-time user token using the device watermark and the user SAC;

forwarding, by the device agent, the decrypted password or the pre-authentication token with the one-time user token, via the client application, to the service agent of the accessed service;

verifying, by the service agent of the accessed service with the broker agent, the one-time user token received from the client application;

authenticating, by the accessed service, the user based on the received password or pre-authentication token included with the verified one-time user token;

notifying the user, by the broker agent, of successful and failed authentication attempts to access the service from the device; and personalization of content and services, by the accessed service, based on the received affiliation score, component scores, and affiliation attributes included with the verified one-time user token.

8. A method of claim 7, wherein the accessed service requires only the affiliation attributes for personalization, and not the authentication attributes for authentication, in the one-time user token.

9. The method of claim 7, wherein the calculation of the affiliation score for a user comprises:

harvesting, by the broker service, a variety of user attributes from a plurality of authoritative data providers through directed queries for the user, wherein the user attributes include information across personal, social, professional, and enterprise categories;

sending an invite to the user to accept an affiliation request from a registered acquaintance for consent to establish an affiliation;

notifying the registered acquaintance of the initiation of the affiliation request to the user, wherein the notification is sent as an email, text, or phone message to the registered acquaintance;

constructing, by the broker service, a directed graph to represent entities as nodes and relationships as links using the user attributes and affiliations;

traversing, by the broker service, the directed graph to calculate a plurality of component scores for the user based on a static or dynamic score type and a score calculus, wherein the score calculus is a discrete value, a ranking equation, a weighted equation, or a multi attribute function; and calculating the affiliation score for the user using a weighted equation based on the component scores.

10. A method of claim 9, wherein the harvesting of user attributes from a data provider is performed by issuing directed queries to retrieve a specific set of attributes for a user and/or organization entity.

11. The method of claim 9, wherein the entities include a community of users, organizations, roles, groups, and attribute-based profiles.

12. The method of claim 9, wherein the relationships represent a set of dependent or independent association attributes and profile attributes mapped to a category, component, score type, score calculus, and impact on the component score.

* * * * *